United States Patent
Terada et al.

(10) Patent No.: US 9,729,878 B2
(45) Date of Patent: Aug. 8, 2017

(54) IMAGE ENCODING METHOD, IMAGE DECODING METHOD, IMAGE ENCODING APPARATUS, IMAGE DECODING APPARATUS, AND IMAGE CODING APPARATUS

(71) Applicant: Panasonic Corporation, Osaka (JP)

(72) Inventors: Kengo Terada, Osaka (JP); Takahiro Nishi, Nara (JP); Youji Shibahara, Osaka (JP); Hisao Sasai, Osaka (JP); Toshiyasu Sugio, Osaka (JP); Toru Matsunobu, Osaka (JP)

(73) Assignee: SUN PATENT TRUST, New York, NY (US)

( * ) Notice: Subject to any disclaimer, the term of this patent is extended or adjusted under 35 U.S.C. 154(b) by 654 days.

(21) Appl. No.: 14/138,335

(22) Filed: Dec. 23, 2013

(65) Prior Publication Data

US 2014/0185672 A1 Jul. 3, 2014

Related U.S. Application Data

(60) Provisional application No. 61/746,658, filed on Dec. 28, 2012.

(51) Int. Cl.
*H04N 19/50* (2014.01)
*H04N 19/11* (2014.01)
*H04N 19/30* (2014.01)

(52) U.S. Cl.
CPC ............. *H04N 19/11* (2014.11); *H04N 19/30* (2014.11)

(58) Field of Classification Search
CPC ...... H04N 19/176; H04N 19/11; H04N 19/61; H04N 19/593; H04N 19/33
See application file for complete search history.

(56) References Cited

U.S. PATENT DOCUMENTS

2006/0120450 A1* 6/2006 Han .................... H04N 19/176
375/240.03
2008/0260043 A1* 10/2008 Bottreau .............. H04N 19/105
375/240.26

(Continued)

FOREIGN PATENT DOCUMENTS

JP 2015-530828 10/2015
WO 2014/036174 3/2014

OTHER PUBLICATIONS

Benjamin Bross et al., "High Efficiency Video Coding (HEVC) text specification draft 9", Joint Collaborative Team on Video Coding (JCT-VC) of ITU-T SG16 WP3 and ISO/IEC JTC1/SC29/WG11, JCTVC-K1003_v13, 11th Meeting: Shanghai, CN, Oct. 10-19, 2012 http://phenix.it-sudparis.eu/jct/doc_end_user/documents/11_Shanghai/wg11/JCTVC-K1003-v13.zip.

(Continued)

*Primary Examiner* — Neil Mikeska
(74) *Attorney, Agent, or Firm* — Wenderoth, Lind & Ponack, L.L.P.

(57) ABSTRACT

An image encoding method includes: generating a first bitstream by encoding an input image, and a first decoded image by encoding and decoding the input image; and generating a second bitstream by encoding the input image using the first decoded image, and a second decoded image by encoding and decoding the input image; wherein the second decoded image has resolution or image quality higher than resolution or image quality of the first decoded image, the generating of a second bitstream and a second decoded image includes generating a prediction block for a current block by intra prediction, and in the generating of a prediction block, the prediction block is generated using (i) pixels included in the second decoded image as top and left reference pixels for the current block, and (ii) pixels (Continued)

included in the first decoded image as right and bottom reference pixels for the current block.

11 Claims, 41 Drawing Sheets

(56) References Cited

U.S. PATENT DOCUMENTS

| | | | |
|---|---|---|---|
| 2010/0246674 A1* | 9/2010 | Park | H04N 19/105 375/240.13 |
| 2012/0201301 A1* | 8/2012 | Bao | H04N 19/105 375/240.14 |
| 2013/0336394 A1* | 12/2013 | Tu | H04N 19/105 375/240.12 |
| 2014/0010292 A1* | 1/2014 | Rapaka | H04N 19/176 375/240.12 |
| 2014/0064360 A1* | 3/2014 | Rapaka | H04N 19/00424 375/240.02 |
| 2014/0086329 A1* | 3/2014 | Seregin | H04N 19/56 375/240.16 |
| 2014/0140392 A1* | 5/2014 | Xu | H04N 19/00018 375/240.02 |
| 2014/0286411 A1* | 9/2014 | Jeong | H04N 19/593 375/240.12 |

OTHER PUBLICATIONS

Tomoyuki Yamamoto et al., "Description of scalable video coding technology proposal by Sharp (proposal 2)", Joint Collaborative Team on Video Coding (JCT-VC) of ITU-T SG16 WP3 and ISO/IEC JTC1/SC29/WG11, JCTVC-K0032r1, 11th Meeting: Shanghai, CN, Oct. 10-19, 2012 http://phenix.it-sudparis.eu/jct/doc_end_user/documents/11_Shanghai/wg11/JCTVC-K0032-v3.zip.

* cited by examiner

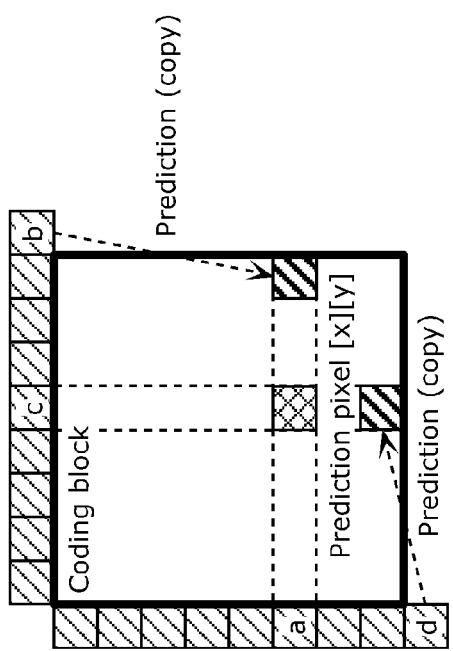
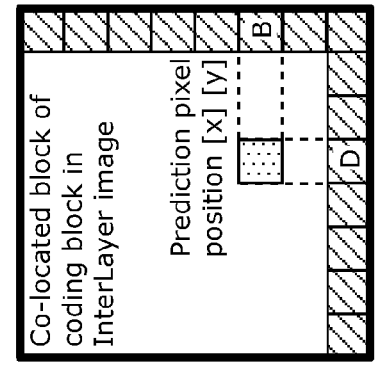
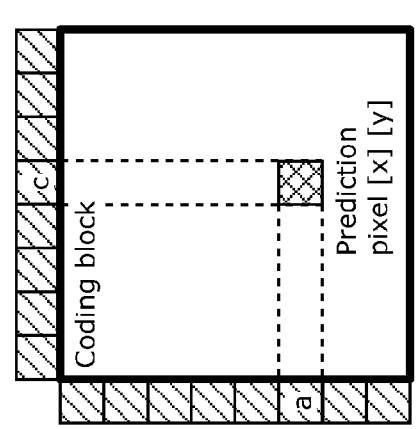

FIG. 34

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

Data structure of PMT

FIG. 45

| Corresponding standard | Driving frequency |
|---|---|
| MPEG-4 AVC | 500 MHz |
| MPEG-2 | 350 MHz |
| ⋮ | ⋮ |

IMAGE ENCODING METHOD, IMAGE DECODING METHOD, IMAGE ENCODING APPARATUS, IMAGE DECODING APPARATUS, AND IMAGE CODING APPARATUS

CROSS REFERENCE TO RELATED APPLICATION

The present application claims the benefit of U.S. Provisional Patent Application No. 61/746,658 filed on Dec. 28, 2012. The entire disclosure of the above-identified application, including the specification, drawings and claims is incorporated herein by reference in its entirety.

FIELD

One or more exemplary embodiments disclosed herein relate generally to an image encoding method for encoding an image and an image decoding method for decoding an image.

BACKGROUND

Non Patent Literature 1 discloses a technique related to an image encoding method for encoding an image (including a moving picture) and an image decoding method for decoding an image. Moreover, Non Patent Literature 2 discloses a technique related a method for encoding an image or a technique related to a method for decoding an image (scalable coding) by separating BaseLayer and Enhancement-Layer having a difference in resolution or image quality.

CITATION LIST

Non Patent Literature

Non Patent Literature 1: Joint Collaborative Team on Video Coding (JCT-VC) of ITU-T SG16 WP3 and ISO/IEC JTC1/SC29/WG11 11th Meeting: Shanghai, CN, 10-19 Oct. 2012
JCTVC-K1003_v13.doc, High efficiency video coding (HEVC) text specification draft 9
http://phenix.it-sudparis.eu/jct/doc_end_user/documents/11_Shanghai/wg11/JCTVC-K1003-v13.zip
Non Patent Literature 2: Joint Collaborative Team on Video Coding (JCT-VC) of ITU-T SG16 WP3 and ISO/IEC JTC1/SC29/WG11 11th Meeting: Shanghai, CN, 10-19 Oct. 2012
JCTVC-K0032.doc, Description of scalable video coding technology proposal by SHARP (proposal 2)
http://phenix.it-sudparis.eu/jct/doc_end_user/documents/11_Shanghai/wg11/JCTVC-K0032-v3.zip

SUMMARY

Technical Problem

There is growing demand that the image encoding method and the image decoding method increase coding efficiency.

One non-limiting and exemplary embodiment provides an image encoding method and an image decoding method that make it possible to increase coding efficiency.

Solution to Problem

In one general aspect, the techniques disclosed here feature an image encoding method including: generating a first bitstream by encoding an input image, and generating a first decoded image by encoding and decoding the input image; and generating a second bitstream by encoding the input image using the first decoded image, and generating a second decoded image by encoding and decoding the input image; wherein the second decoded image has resolution or image quality higher than resolution or image quality of the first decoded image, the generating of a second bitstream and a second decoded image includes generating a prediction block for a current block by intra prediction, and in the generating of a prediction block, the prediction block is generated using (i) pixels included in the second decoded image as top and left reference pixels for the current block, and (ii) pixels included in the first decoded image as right and bottom reference pixels for the current block.

General and specific aspects disclosed above may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

One or more exemplary embodiments disclosed herein provide an image encoding method and an image decoding method which can increase coding efficiency.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 8 is a diagram for explaining a method for calculating a prediction pixel of the Planar mode EL type according to Embodiment 1.

FIG. 9A is a diagram for explaining a method for calculating a prediction pixel of the Planar mode ELBL type according to Embodiment 1.

FIG. 9B is a diagram for explaining a method for calculating a prediction pixel of the Planar mode ELBL type according to Embodiment 1.

FIG. 34 illustrates a structure of multiplexed data.

FIG. 45 shows an example of a look-up table in which video data standards are associated with driving frequencies.

DESCRIPTION OF EMBODIMENTS

Figure 1:
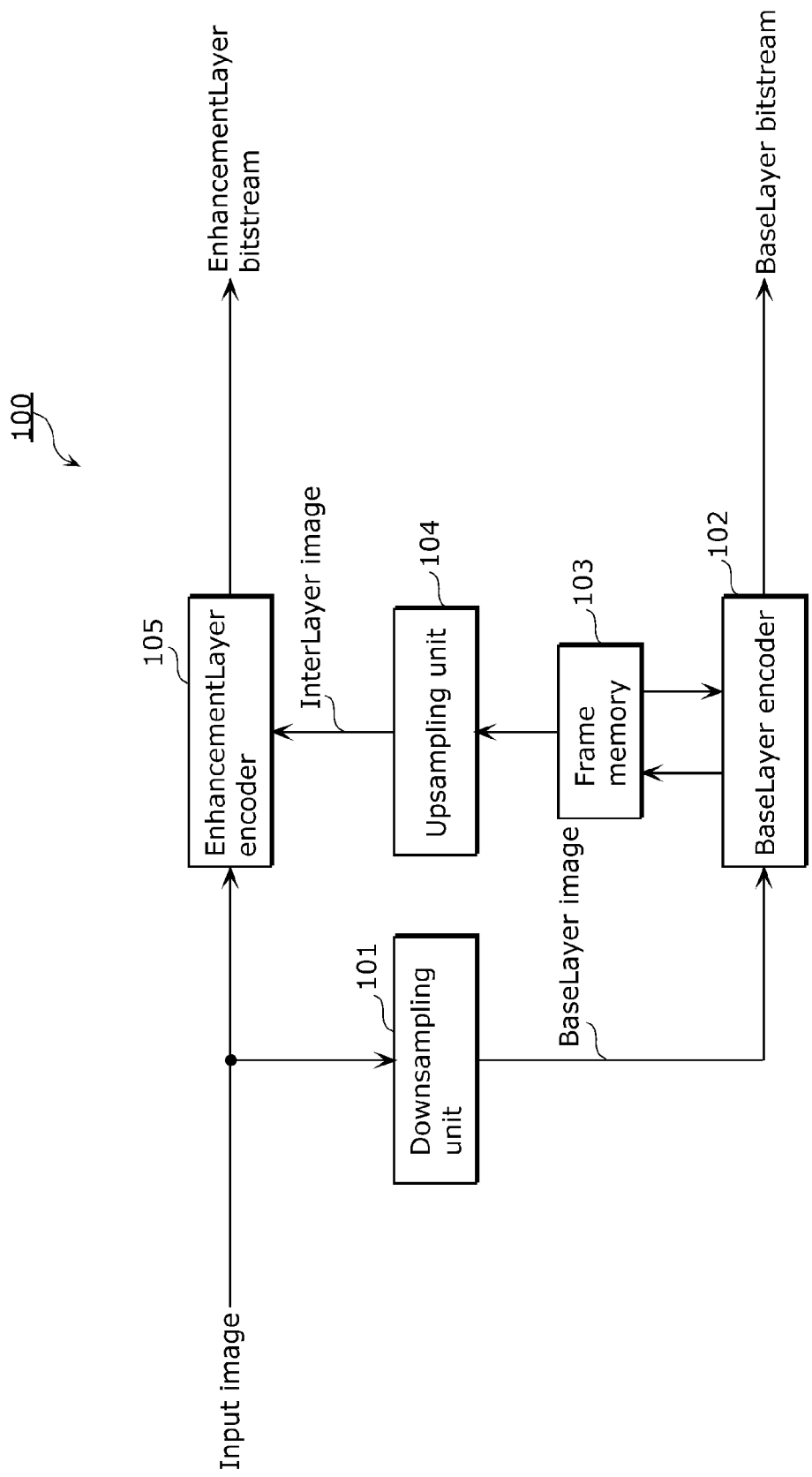
FIG. 1 is a block diagram of an image encoding apparatus according to Embodiment 1.

Underlying Knowledge Forming Basis of the Present Disclosure

In relation to the image encoding apparatus which encodes an image and the image decoding apparatus which decodes an image disclosed in the Background section, the inventors have found the following problem.

In recent years, rapid advance of technology in digital video devices leads to an increase in opportunities of performing compression encoding on a video signal inputted from a video camera or a television tuner (a plurality of pictures lined in a temporal sequence) and storing it in recording medium such as DVD and hard disk. Although the video coding standard is currently the standard denoted as H.264/MPEG-4 advanced video coding (MPEG-4 AVC), a next-generation video encoding standard called High-Efficiency Video Coding (HEVC) standard (Non Patent Literature 1) is being considered. Moreover, scalable coding is considered for encoding and decoding an image by dividing the image into two layers (BaseLayer (BL), EnhancementLayer (EL)) having different resolution and image quality (Non Patent Literature 2).

The current intra prediction of scalable coding (Non Patent Literature 2) includes a method which is the same as the HEVC standard (Non Patent Literature 1) and a method used in predicting InterLayer image obtained by upsampling a BaseLayer image.

However, the method which is the same as the HEVC standard is prediction from the encoded or decoded upper pixel, the left pixel, and the upper left pixel of the current block, the method for using InterLayer image in prediction is prediction from a co-located block of a coding block within the InterLayer image. Therefore, when a correlation between (i) the co-located block in the InterLayer image or the upper left pixel and (ii) the coding block is low, coding efficiency is reduced.

According to an exemplary embodiment disclosed herein, an image encoding method features an image encoding method including: generating a first bitstream by encoding an input image, and generating a first decoded image by encoding and decoding the input image; and generating a second bitstream by encoding the input image using the first decoded image, and generating a second decoded image by encoding and decoding the input image; wherein the second decoded image has resolution or image quality higher than resolution or image quality of the first decoded image, the generating of a second bitstream and a second decoded image includes generating a prediction block for a current block by intra prediction, and in the generating of a prediction block, the prediction block is generated using (i) pixels included in the second decoded image as top and left reference pixels for the current block, and (ii) pixels included in the first decoded image as right and bottom reference pixels for the current block.

With this, the image encoding method makes it possible to increase coding efficiency using the right and bottom reference images included in the first decoded image.

For example, the intra prediction includes a Planar mode in which a prediction pixel for a current pixel is generated using reference pixels in an upper direction, a left direction, a lower direction, and a right direction of the current pixel included in the current block, and in the generating of a prediction block, in the Planar mode, the prediction pixel is generated using (i) pixels that are in an upper direction and a left direction of the current block and are included in the second decoded image, as reference pixels in an upper direction and a left direction of the current block, and (ii) pixels that are in a right direction and a lower direction of a co-located block of the current pixel and are included in the first decoded image, as reference pixels in a right direction and a lower direction of the current pixel.

For example, the intra prediction includes a DC mode in which prediction pixels for pixels included in the current block are generated using an average of reference pixels adjacent to the current block, and in the generating of a prediction block, in the DC mode, the prediction pixel is generated using an average of (i) reference pixels that are adjacent to an upper direction and a left direction of the current block and are included in the second decoded image, and (ii) reference pixels that are adjacent to a right direction and a lower direction of a co-located block of the current block and are included in the first decoded image.

For example, the intra prediction includes an Angular mode in which a prediction pixel for a current pixel is generated, using a reference pixel located in a prediction direction of the current pixel included in the current block, and in the generating of a prediction block, in the Angular mode, the prediction pixel is generated using (i) reference pixels that are in an upper direction, a left direction, a lower left direction, and an upper right direction of the current block and are included in the second decoded image, and (ii) reference pixels that are in a right direction, a lower direction, an upper right direction, and a lower left direction of a co-located block of the current block and are included in the first decoded image.

For example, in the generating of a prediction block: a plurality of prediction pixels for a plurality of pixels included in the current block are generated; and prediction pixels at a right end and a lower end in the current block among the prediction pixels are corrected using a co-located pixel of the prediction pixel or a surrounding pixel of the co-located pixel, the collocated pixel and the surrounding pixel being included in the first decoded image.

With this, the image encoding method makes it possible to increase coding efficiency by correcting a prediction pixel of the current block using pixels included in the first decoded image.

According to an exemplary embodiment disclosed herein, an image decoding method is an image decoding method including: generating a first decoded image by decoding a first bitstream; and generating a second decoded image by decoding a second bitstream using the first decoded image; wherein the second decoded image has resolution or image quality higher than resolution or image quality of the first decoded image, the generating of a second decoded image includes generating a prediction block for a current block by intra prediction, and in the generating of a prediction block, the prediction block is generated using pixels included in the second decoded image as top and left reference pixels for the current block, and using pixels included in the first decoded image as reference pixels on right and bottom of the current block.

With this, the image decoding method makes it possible to decode a bitstream having increased coding efficiency.

For example, the intra prediction includes a Planar mode in which a prediction pixel for a current pixel is generated using reference pixels in an upper direction, a left direction, a lower direction, and a right direction of the current pixel included in the current block, and in the generating of a prediction block, in the Planar mode, the prediction pixel is generated using (i) pixels that are in an upper direction and a left direction of the current block and are included in the second decoded image, as reference pixels in an upper direction and a left direction of the current block, and (ii) pixels that are in a right direction and a lower direction of a co-located pixel of the current pixel and are included in the first decoded image, as reference pixels in a right direction and a lower direction of the current pixel.

For example, the intra prediction includes a DC mode in which prediction pixels for pixels included in the current block are generated using an average of reference pixels adjacent to the current block, and in the generating of a prediction block, in the DC mode, the prediction pixel is generated using an average of (i) reference pixels that are adjacent to an upper direction and a left direction of the current block and are included in the second decoded image, and (ii) reference pixels that are adjacent to a right direction and a lower direction of a block located at a co-located block of the current block and are included in the first decoded image.

For example, the intra prediction includes an Angular mode in which a prediction pixel for a current pixel is generated using a reference pixel located in a prediction direction of the current pixel included in the current block, and in the generating of a prediction block, in the Angular mode, the prediction pixel is generated using (i) reference pixels that are in an upper direction, a left direction, a lower left direction, and an upper right direction of the current block and are included in the second decoded image, and (ii) reference pixels that are in a right direction, a lower direction, an upper right direction, and a lower left direction of a co-located block of the current block and are included in the first decoded image.

For example, in the generating of a prediction block: a plurality of prediction pixels for a plurality of pixels included in the current block are generated; and prediction pixels at a right end and a lower end in the current block among the prediction pixels are corrected using a co-located pixel of the prediction pixel or a surrounding pixel of the co-located pixel, the co-located pixel and the surrounding pixel being included in the first decoded image.

Moreover, in one general aspect, an image encoding apparatus according to an aspect of the present disclosure is an image encoding apparatus including: a first encoder which generates a first bitstream by encoding an input image, and generates a first decoded image by encoding and decoding the input image; and a second encoder which generates a second bitstream by encoding the input image using the first decoded image, and generates a second decoded image by encoding and decoding the input image; wherein the second decoded image has resolution or image quality higher than resolution or image quality of the first decoded image, the second encoder includes an intra prediction unit configured to generate a prediction block for a current block by intra prediction, and the intra prediction unit is configured to generate the prediction block using (i) pixels included in the second decoded image as top and left reference pixels for the current block, and (ii) pixels included in the first decoded image as right and bottom reference pixels for the current block.

With this, the image encoding apparatus makes it possible to increase coding efficiency using, in intra prediction, the right and bottom reference images included in the first decoded image.

According to an exemplary embodiment disclosed herein, an image decoding apparatus is an image decoding apparatus including: a first decoder which generates a first decoded image by decoding a first bitstream; and a second decoder which generates a second decoded image by decoding a second bitstream using the first decoded image; wherein the second decoded image has resolution or image quality higher than the resolution or the image quality of the first decoded image, the second decoder includes an intra prediction unit configured to generate a prediction block for a current block by intra prediction, and the intra prediction unit is configured to generate the prediction block using (i) pixels included in the second decoded image as top and left reference pixels for the current block, and (ii) pixels included in the first decoded image as right and bottom reference pixels for the current block.

With this, the image decoding method makes it possible to decode a bitstream having increased coding efficiency.

According to an exemplary embodiment disclosed herein an image coding apparatus includes the image encoding apparatus and the image decoding apparatus.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Hereinafter, certain exemplary embodiments are described in greater detail with reference to the accompanying Drawings embodiments with reference to the Drawings in detail. It should be noted that the embodiments to be described later are mere specific examples of the present disclosure. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims indicating the most generic concept are described as arbitrary structural elements.

Embodiment 1

Overall Configuration

FIG. 1 is a functional block diagram of an image encoding apparatus 100 according to the present embodiment. As shown in FIG. 1, the image encoding apparatus 100 includes a downsampling unit 101, a BaseLayer encoder 102, a frame memory 103, an upsampling unit 104, and an EnhancementLayer encoder 106.

Operation (Overall)

Figure 2:
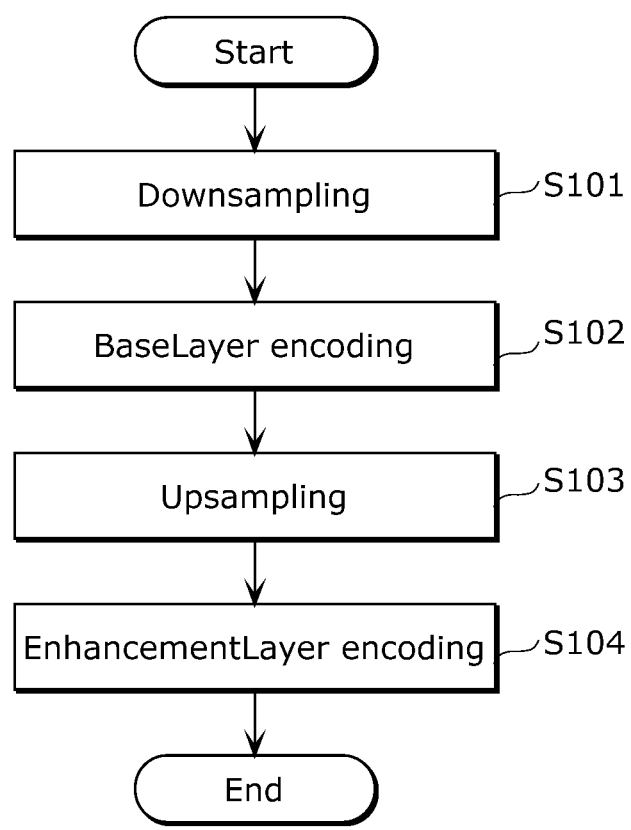
FIG. 2 is a flowchart of image encoding processing according to Embodiment 1.

Next, with reference to FIG. 2, a flow of the overall encoding processing will be described.

First, the downsampling unit 101 generates an image (BaseLayer image) having a reduced resolution obtained by downsampling an input image (S101).

Next, the BaseLayer encoder 102 generates a BaseLayer bitstream by encoding the BaseLayer image in a form conforming to the standard of Non Patent Literature 1 (S102). Moreover, the BaseLayer encoder 102 generates the BaseLayer decoded image by encoding and then decoding the BaseLayer image, and stores the BaseLayer image in the memory frame 103.

Next, the upsampling unit 104 generates an image (Interlayer image) having the same resolution as that of the input image by upsampling the BaseLayer decoded image generated by the BaseLayer encoder 102 (S103).

Next, the EnhancementLayer encoder 105 generates an EnhancementLayer bitstream by encoding the input image using the InterLayer image (S104).

The following will describe the characteristic EnhancementLayer encoder 105 in detail.

<Configuration of EnhancementLayer Encoder 105>

Figure 3:
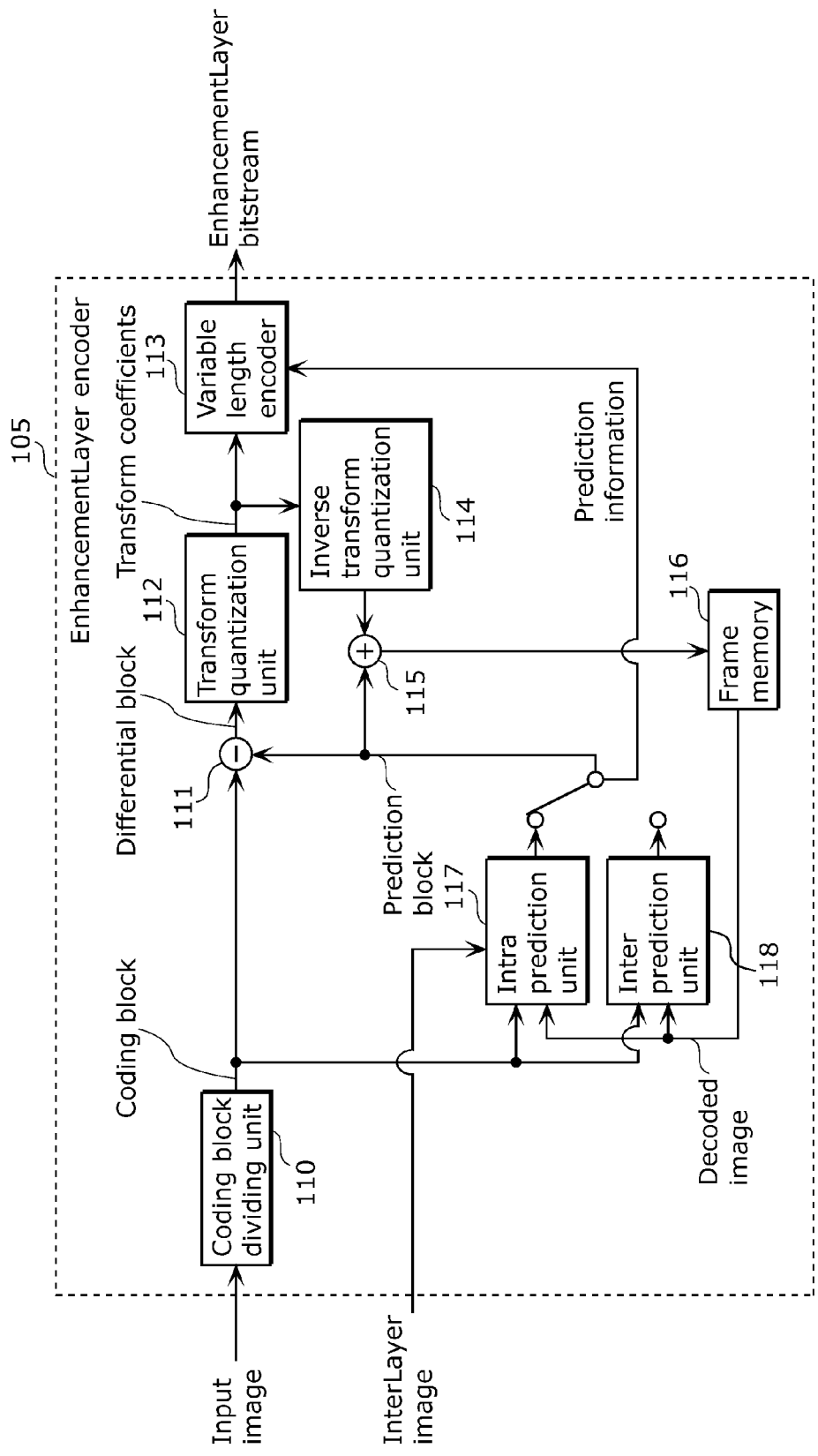
FIG. 3 is a block diagram of an EnhancementLayer encoder according to Embodiment 1.

FIG. 3 is a block diagram showing an internal configuration of an EnhancementLayer encoder 105. As shown in FIG. 3, the EnhancementLayer encoder 105 includes a coding block dividing unit 110, a subtractor 111, a transform quantization unit 112, a variable length encoder 113, an inverse transform quantization unit 114, an adder 115, a frame memory 116, an intra prediction unit 117, and an inter prediction unit 118.

<Operation (EnhancementLayer Encoding)>

Figure 4:
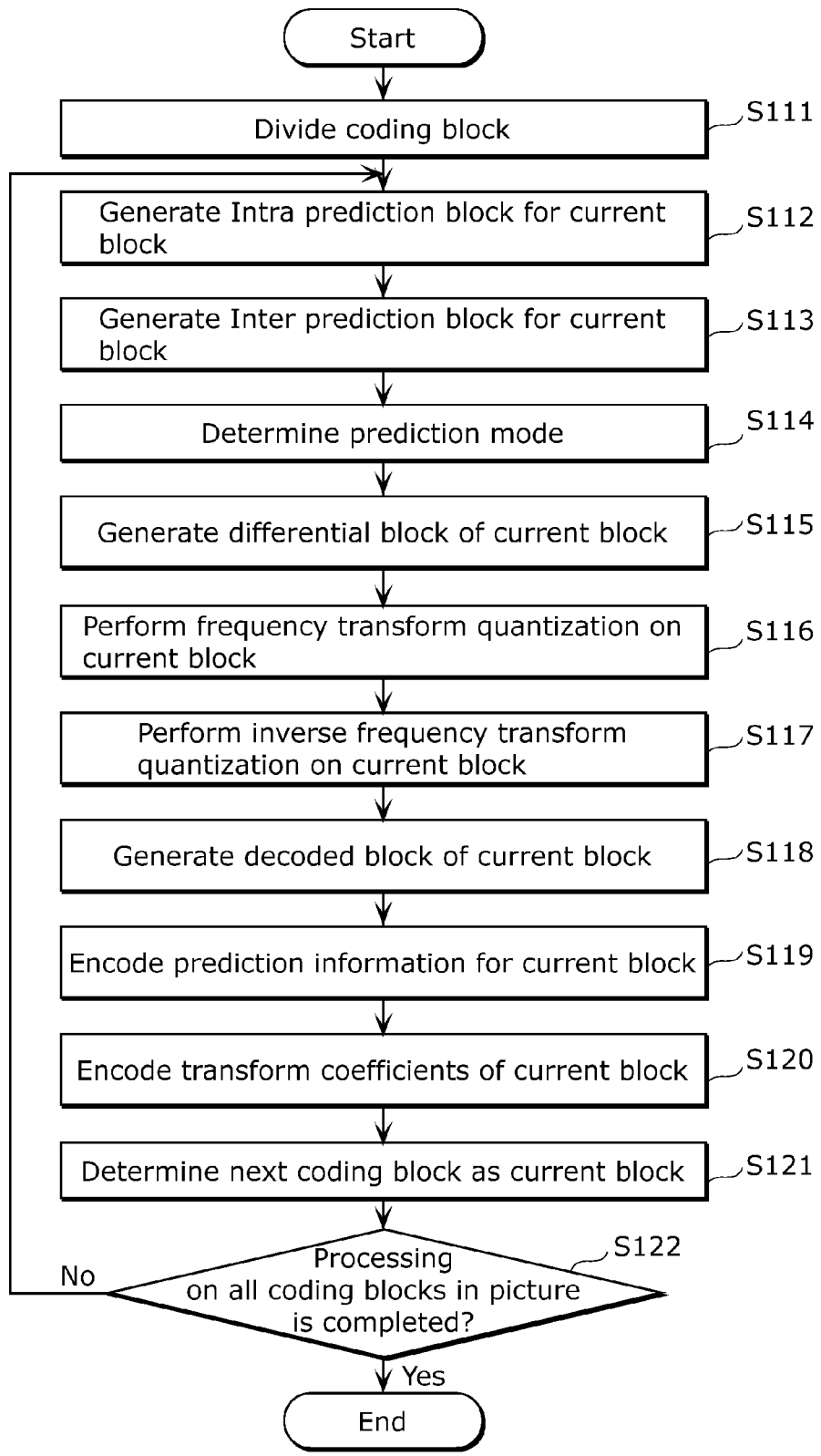
FIG. 4 is a flowchart of EnhancementLayer encoding processing according to Embodiment 1.

Next, with reference to FIG. 4, a flow of EnhancementLayer encoding processing (S104 in FIG. 2) will be described.

First, the coding block dividing unit 110 divides the input image into coding blocks (S111).

Next, the intra prediction unit 117 and the inter prediction unit 118 determine prediction information such as prediction block, cost, and prediction mode of inter prediction/intra prediction (S112, S113), and determines the prediction block using the information (S114).

Next, the subtractor 111 generates a differential block by calculating a difference between the prediction block and the coding block (S115). The transform quantization unit 112 generates transform coefficients by performing frequency transform and quantization on the differential block (S116). Then, the inverse transform quantization unit 114 reconstructs the differential block by performing inverse quantization and inverse frequency transform on the transform coefficients (S117). The adder 115 generates a decoded block by adding the reconstructed differential block and the prediction block (S118). The decoded block is stored in the frame memory 116 as the decoded image (EnhancementLayer decoded image).

Next, the variable length encoder 113 encodes the transform coefficients generated by frequency transform and quantization and prediction information (S119, S120).

Then, the EnhancementLayer encoder 105 shifts the process to the next coding block, and repeats S112 to S121 until the processing on all the coding blocks in the picture is completed (S121, S122). It should be noted that the EnhancementLayer encoder 105 performs processing on the coding blocks in a raster scan order from the upper left to the lower right of the picture.

The following will describe the characteristic intra prediction unit 117 in detail.

<Configuration of Intra Prediction Unit 117>

Figure 5:
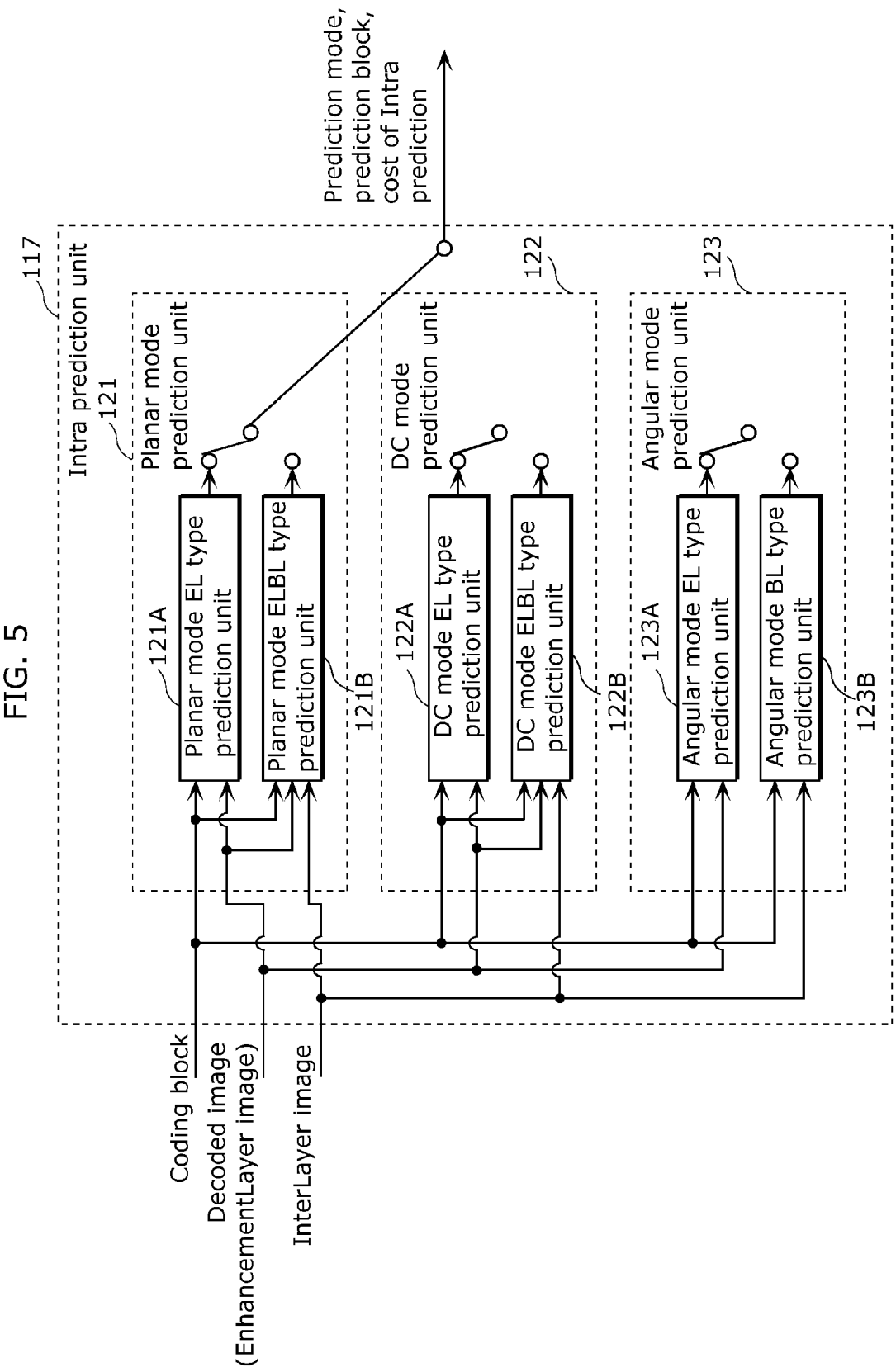
FIG. 5 is a block diagram of an intra encoder according to Embodiment 1.

FIG. 5 is a block diagram showing an internal configuration of the intra prediction unit 117. As shown in FIG. 5, the intra prediction unit 117 includes a Planar mode prediction unit 121, a DC mode prediction unit 122, and an Angular mode prediction unit 123. The Planer mode prediction unit 121 includes a Planar mode EL type prediction unit 121A and a Planar mode ELBL type prediction unit 121B. The DC mode prediction unit 122 includes a DC mode EL type prediction unit 122A and a DC mode ELBL type prediction unit 122B. The Angular mode prediction unit 123 includes an Angular mode EL type prediction unit 123A and an Angular mode BL type prediction unit 123B.

<Operation (Intra Prediction)>

Figure 6:
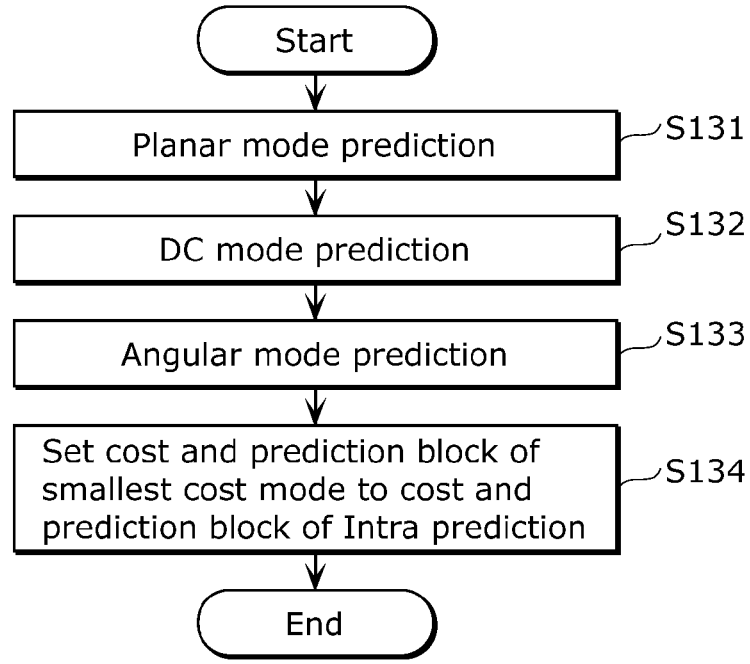
FIG. 6 is a flowchart of intra encoding processing according to Embodiment 1.

Next, with reference to FIG. 6, a flow of the overall intra prediction processing (S112 in FIG. 4) will be described.

First, the Planar mode prediction unit 121 generates cost and a prediction block of the Planar mode (S131). First, the DC mode prediction unit 122 generates cost and a prediction block of the DC mode (S132). The Angular mode prediction unit 123 generates cost, a prediction direction, and a prediction block of the Angular mode (S133). Each of the predictions will be described later in detail. It should be noted that the cost is calculated from a difference between the prediction block and the coding block, and an encoding amount of the prediction information.

Next, the intra prediction unit 117 sets cost and a prediction block of a prediction mode with the smallest cost to the cost and prediction block of the intra prediction (S134).

<Operation (Planar Mode Prediction)>

Figure 7:
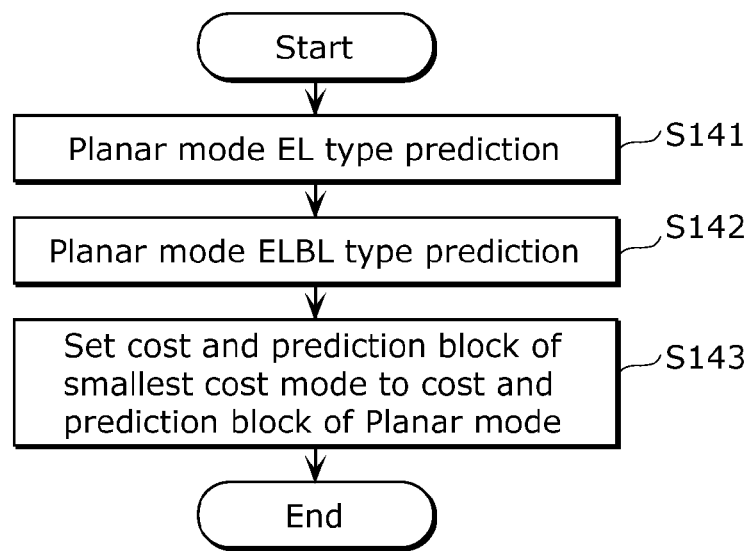
FIG. 7 is a flowchart of Planar mode prediction processing according to Embodiment 1.

Next, with reference to FIG. 7, a flow of the Planar mode prediction processing (S131 in FIG. 6) will be described.

First, the Planar mode EL type prediction unit 121A generates cost and a prediction block of the Planar mode EL type (S141). FIG. 8 shows a method for calculating each of the prediction pixels in the prediction block. Each of the prediction pixels is calculated by the following expression (1).

$$\text{Prediction pixel}[x][y] = ((nT-1-x) \times EL[-1][y] + (x+1) \times EL[nT][-1] + (nT-1-y) \times EL[x][-1] + (y+1) \times EL[-1][nT] + nT) >> (\log 2(nT)+1) \quad (1)$$

Here, x and y denote a horizontal direction position and a vertical direction position, respectively, in the coding block (prediction block), and EL [x] [y] denotes a reference pixel in the EnhancementLayer decoded image (encoded and decoded EnhancementLayer images). Moreover, nT denotes a horizontal width of the coding block size.

As shown in a spatial image diagram in FIG. 8, as the reference pixels, a left pixel a and a top pixel c of the prediction pixel, and an upper right pixel b and a lower left pixel d of the coding block are used. Conceptually, pixels in the coding block are predicted from the surrounding pixels of the coding block by bilinear. Since the pixel on the right of the coding block and the pixel on the bottom of the coding block are not encoded yet, the pixel on the upper right of the coding block and the pixel on the lower left of the coding block are used instead of the right and bottom pixels.

Next, the Planar mode ELBL type prediction unit 121B generates cost and a prediction block of the Planar mode ELBL type (S142). FIG. 9A and FIG. 9B each show a method for calculating each of the prediction pixels in the prediction block. Each of the prediction pixels is calculated by the following expression (2).

$$\text{Prediction pixel}[x][y] = ((nT-1-x) \times EL[-1][y] + (x+1) \times BL[nT-1][y] + (nT-1-y) \times EL[x][-1] + (y+1) \times BL[x][nT-1] + nT) >> (\log 2(nT)+1) \quad (2)$$

Here, BL [x] [y] denotes a reference pixel in the InterLayer image obtained by upsampling the BaseLayer decoded image.

As shown in a spatial image diagram in FIG. 9A and FIG. 9B, the right end pixel B and the bottom end pixel D of the co-located block of the coding block in the InterLayer image are used as the reference pixels, instead of the upper right pixel b and the lower left pixel d of the coding block of the Planar mode EL type.

First, the Planar mode prediction unit 121 sets the cost and prediction block of the smallest cost type to the cost and a prediction block of the Planar mode (S143).

<Operation (DC Mode Prediction)>

Figure 10:
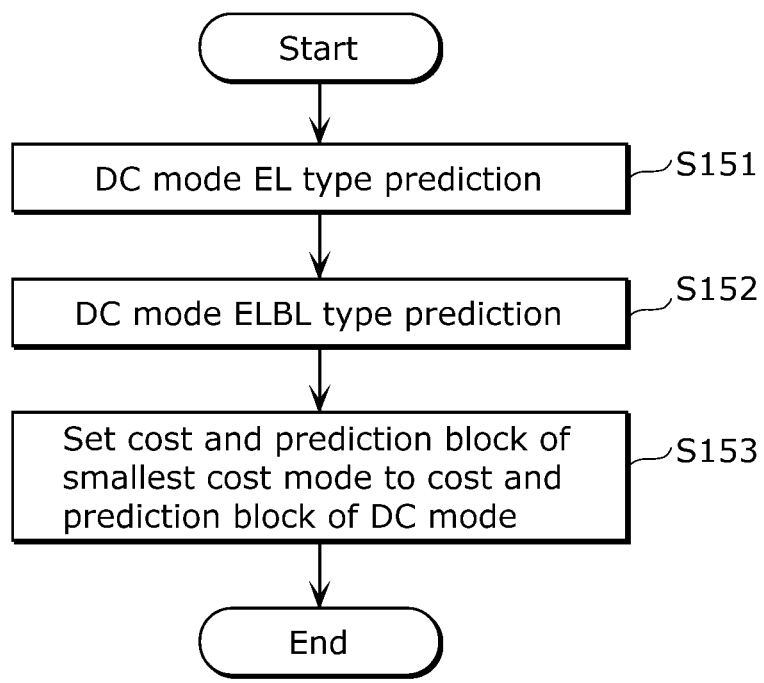
FIG. 10 is a flowchart of DC mode prediction processing according to Embodiment 1.

Next, with reference to FIG. 10, a flow of the DC mode prediction processing (S132 in FIG. 6) will be described.

Figure 11:
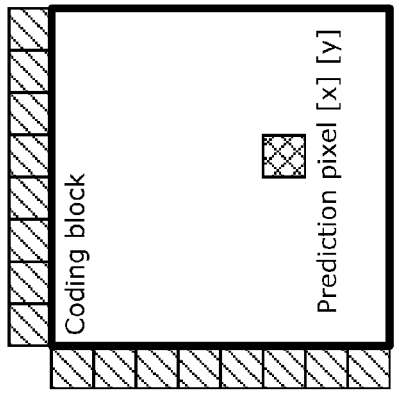
FIG. 11 is a diagram for explaining a method for calculating a prediction pixel of the DC mode EL type according to Embodiment 1.

First, the DC mode EL type prediction unit 122A generates cost and a prediction block of the DC mode EL type (S151). FIG. 11 shows a method for calculating each of the prediction pixels in the prediction block. Each of the prediction pixels is calculated by the following expression (3).

[Math. 1]

$$\text{Prediction pixel } [x][y] = \left( \left( \sum_{x'=0}^{nT-1} EL[x'][-1] + \sum_{y'=0}^{nT-1} EL[-1][y'] + nT \right) >> (\log 2(nT)+1) \right) \quad (3)$$

As shown in a spatial image diagram in FIG. 11, the DC mode EL type prediction unit 122A uses the surrounding blocks of the top and the left of the coding block as the reference pixels, and calculates the average of the images as the prediction pixel.

Figure 12B:
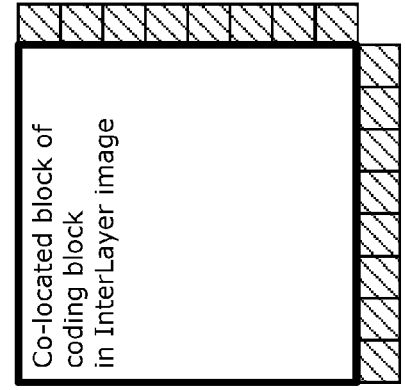
FIG. 12B is a diagram for explaining a method for calculating a prediction pixel of the DC mode ELBL type according to Embodiment 1.
Figure 12A:
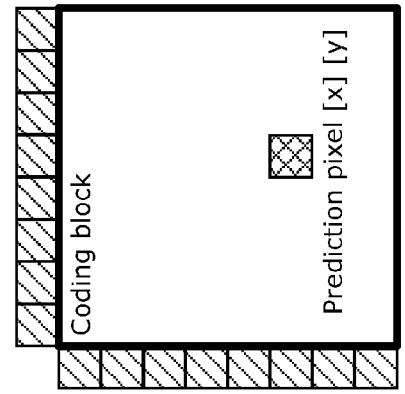
FIG. 12A is a diagram for explaining a method for calculating a prediction pixel of the DC mode ELBL type according to Embodiment 1.

Next, the DC mode ELBL type prediction unit 122B generates cost and a prediction block of the DC mode ELBL type (S152). FIG. 12A and FIG. 12B each show a method for calculating each of the prediction pixels in the prediction block. Each of the prediction pixels is calculated by the following expression (4).

[Math. 2]

$$\text{Prediction pixel } [x][y] = \left( \left( \sum_{x'=0}^{nT-1} EL[x'][-1] + \sum_{y'=0}^{nT-1} EL[-1][y'] + \sum_{x'=0}^{nT-1} BL[x'][nT] + \sum_{y'=0}^{nT-1} BL[nT][y'] + nT*2 \right) >> (Log2(nT) + 2) \right) \quad (4)$$

As shown in a spatial image diagram in FIG. 12A and FIG. 12B, the DC mode ELBL type prediction unit 122B uses not only the surrounding blocks of the top and the left of the coding block but also the surrounding blocks of the right and the bottom of the co-located block of the coding block in the InterLayer image as the reference pixels, and calculates the average of the surrounding pixels as the prediction pixel.

Next, the DC mode prediction unit 122 sets the cost and the prediction block of the smallest cost type to the cost and the prediction block of the DC mode (S153).

<Operation (Angular Mode Prediction)>

Figure 13:
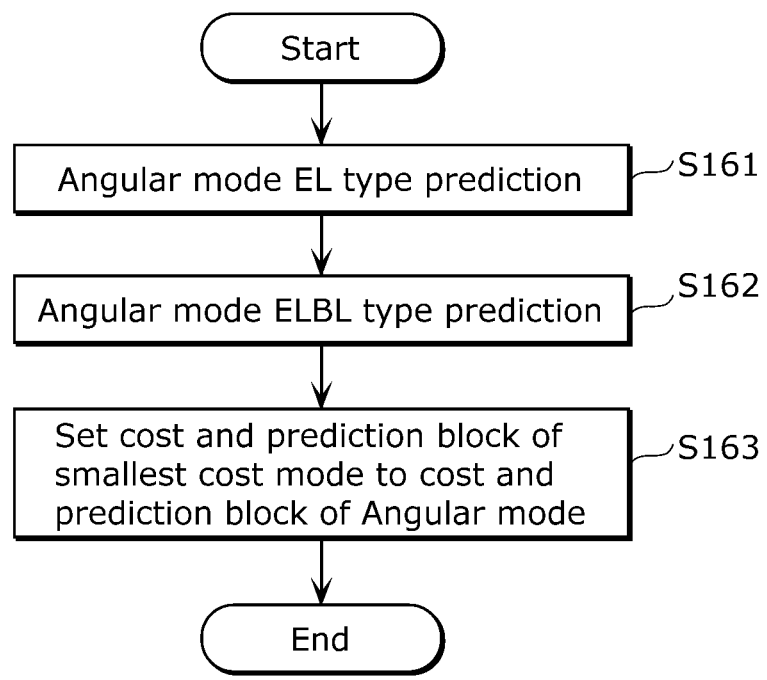
FIG. 13 is a flowchart of Angular mode prediction processing according to Embodiment 1.

Next, with reference to FIG. 13, a flow of the Angular mode prediction processing (S133 in FIG. 6) will be described.

Figure 14:
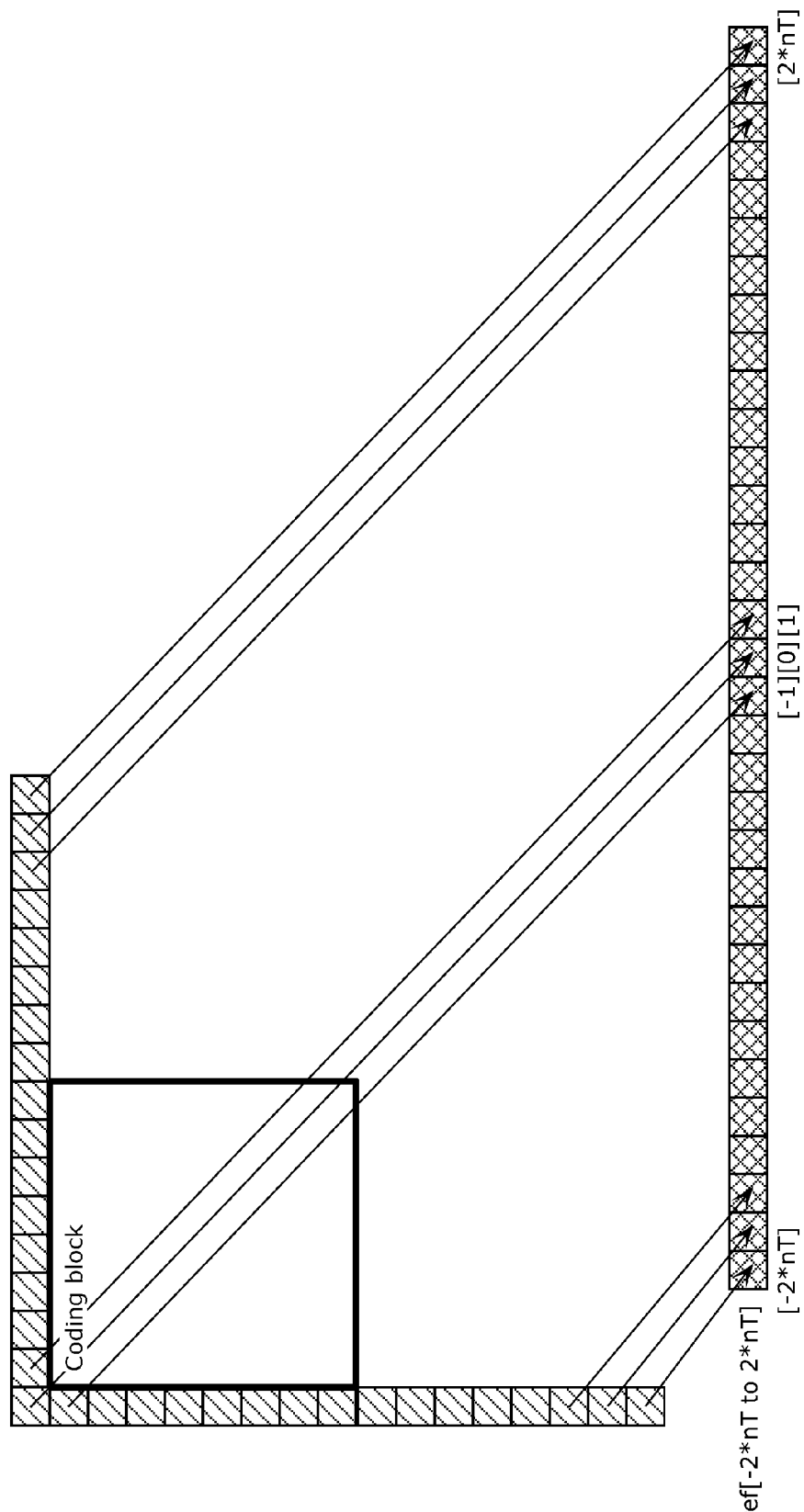
FIG. 14 is a diagram for explaining a method for calculating a prediction pixel of the Angular mode EL type according to Embodiment 1.

First, the Angular mode EL type prediction unit 123A generates the smallest cost of the Angular mode EL type, and a prediction direction and a prediction block of the smallest cost (S161). FIG. 14 shows a method for calculating each of the prediction pixels in the prediction block. Each of the prediction pixels is calculated by the following expression (5).

Prediction pixel[x][y]=prediction pixel generating function(ref[−2×nT to 2×nT]) (5)

Here, ref [ ] is a one-dimensional array, and the surrounding blocks of the top and the left of the coding block are copied as follows before the processing.

ref[0 to 2×nT]=EL[s][−1](x=−1 to 2×nT−1])

ref[1 to 2×nT]=EL[−1][y](y=0 to 2×nT−1])

The prediction pixel generating function is the same as the conventional function (Non Patent Literature 1), and generates prediction pixels in a plurality of prediction directions.

As shown in a spatial image diagram in FIG. 14, a prediction pixel is generated using pixels on the top pixel and the left pixel of the coding block.

Figure 15:
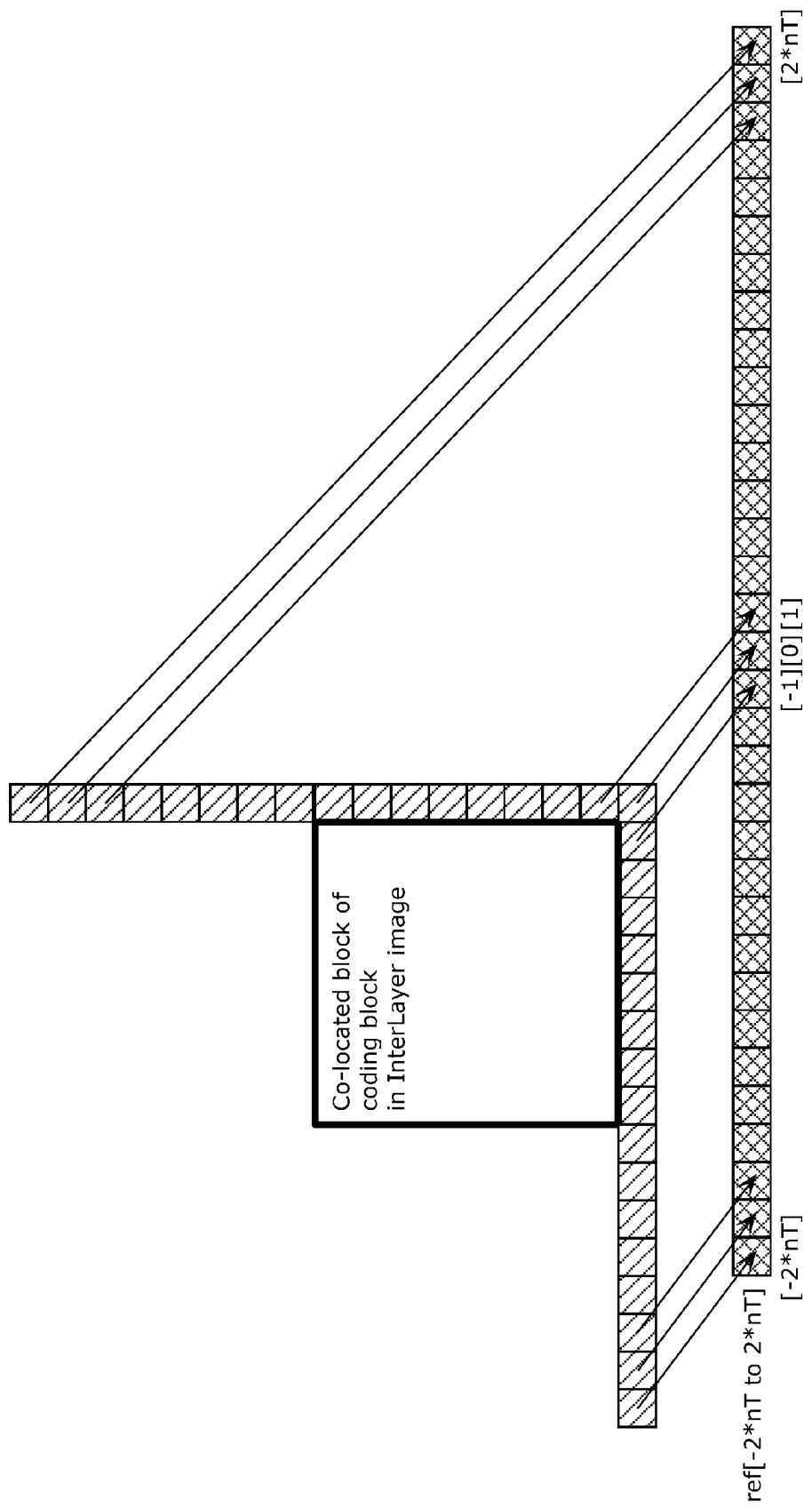
FIG. 15 is a diagram for explaining a method for calculating a prediction pixel of the Angular mode BL type according to Embodiment 1.

Next, the Angular mode BL type prediction unit 123B generates the smallest cost of the Angular mode BL type, a prediction direction and a prediction block of the smallest cost (S162). FIG. 15 shows a method for calculating each of the prediction pixels in the prediction block. Each of the prediction pixels is calculated by the following expression (6).

Prediction pixel[x][y]=prediction pixel generating function(ref [−2×nT to 2×nT]) (6)

Although the expression (6) is the same as the expression (5) of the Angular mode EL type, a reference pixel to be copied on ref [ ] to be used is different.

ref[0 to 2×nT]=BL[nT][y](y=nT to −nT)

ref[−1 to −2×nT]=BL[x][nT](x=nT−1 to −nT)

As shown in a spatial image diagram in FIG. 15, the surrounding pixels of the right and the bottom of the co-located block of the coding block in the InterLayer image are used.

Next, the Angular mode prediction unit 123 sets the cost, the prediction direction, and the prediction block of the smallest cost type to cost, a prediction direction, and a prediction block of the Angular mode (S163).

<Effect>

As described above, the image encoding apparatus according to the present embodiment can decrease prediction error and increase coding efficiency since the intra prediction block can be generated using not only the pixels in the top, the left, and upper left directions but also the pixels in the right, the bottom, and the lower right directions. More specifically, although in the Planar mode the upper right and the lower left pixels of the coding block are substituted as the right and bottom pixels of all prediction pixels, the image encoding apparatus can reduce prediction error using the right and the bottom pixels corresponding to the positions of the prediction pixel in the InterLayer image. Moreover, although in the DC mode only the upper and left surrounding pixels are used, the image encoding apparatus uses the pixel information of all the surrounding of the coding block, by using the right and bottom surrounding pixels in the InterLayer image. With this, prediction error is reduced. Moreover, although in Angular mode there are only predictions from the top, left, and upper left directions, the image encoding apparatus can use predictions effectively from the right, bottom, and lower right directions, by using the right and bottom surrounding pixels of the InterLayer image. Accordingly, since the options of prediction directions are increased, prediction error is reduced. Especially, in an image having a low correlation between the top/left/upper left pixels and the current pixel and a high correlation between the current pixel and the right, bottom, or lower right pixel, prediction error can be reduced.

Moreover, in the BL type of the Angular mode, the prediction pixel generating function (prediction pixel generation processing) is not changed for the EL type, and only the reference pixel to be used are changed. With this, an increase in the circuit size and the code size is reduced. Specifically, prediction from the right, bottom, and lower right directions are realized by not changing the prediction pixel generating function but by switching the reference pixel to the bottom reference pixel and right reference pixel from the left reference pixel and the top reference pixel.

Moreover, in the Planar mode and the DC mode, the image encoding apparatus can reduce prediction error by generating a prediction pixel by combining the pixel in the EnhancementLayer image and the pixel in the InterLayer image. More specifically, the image encoding apparatus uses an EnhancementLayer pixel in the upper and left reference pixels in the Planar mode, uses a BaseLayer pixel in the right and the bottom reference pixels, and generates a prediction pixel by an expression such as weighted average using the pixels. In other words, the image encoding method uses the EnhancementLayer pixel having the same resolution or the same image quality as that of the coding block when using an encoded and decoded pixel, and by using the BaseLayer pixel instead of the EnhancementLayer pixel in a different position when using a pixel that is not encoded and decoded. With this, prediction error is reduced. Moreover, since in the DC mode the right and left reference pixels are not encoded and decoded, the BaseLayer pixel instead of the EnhancementLayer pixel is used. The image encoding apparatus blends the pixels with the EnhancementLayer pixel of the upper and left reference pixels. With this, prediction error is reduced.

Figure 16B:
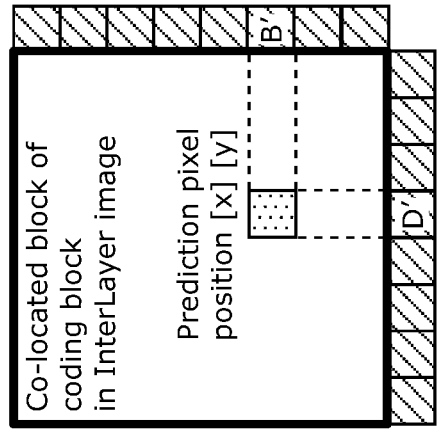
FIG. 16B is a diagram for explaining a modification of a method for calculating a prediction pixel of the Planar mode ELBL type according to Embodiment 1.
Figure 16A:
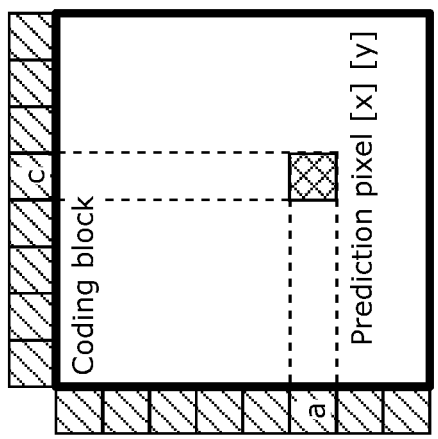
FIG. 16A is a diagram for explaining a modification of a method for calculating a prediction pixel of the Planar mode ELBL type according to Embodiment 1.

It should be noted that as shown in FIG. 9A and FIG. 9B, regarding the Planar mode ELBL type, although the right end pixel B and the lower end pixel D in the co-located block of the coding block in the InterLayer image are used as the reference pixels, the right surrounding pixel B' and the bottom surrounding pixel D' may be used as the reference pixels as shown in FIG. 16A and FIG. 16B. Each of the prediction pixels is calculated by the following expression (7).

Prediction pixel[x][y]=((nT-1-x)×EL[-1][y]+(x+1)× BL[nT][y]+(nT-1-y)×EL[x][-1]+(y+1)×BL[x][nT]+nT)>>(Log 2(nT)+1)    (7)

Accordingly, since the reference pixel in the Planar mode ELBL type is the same as that of the DC mode ELBL type, memory efficiency such as the load of pixel and a cache hit ratio can be increased.

Figure 17:
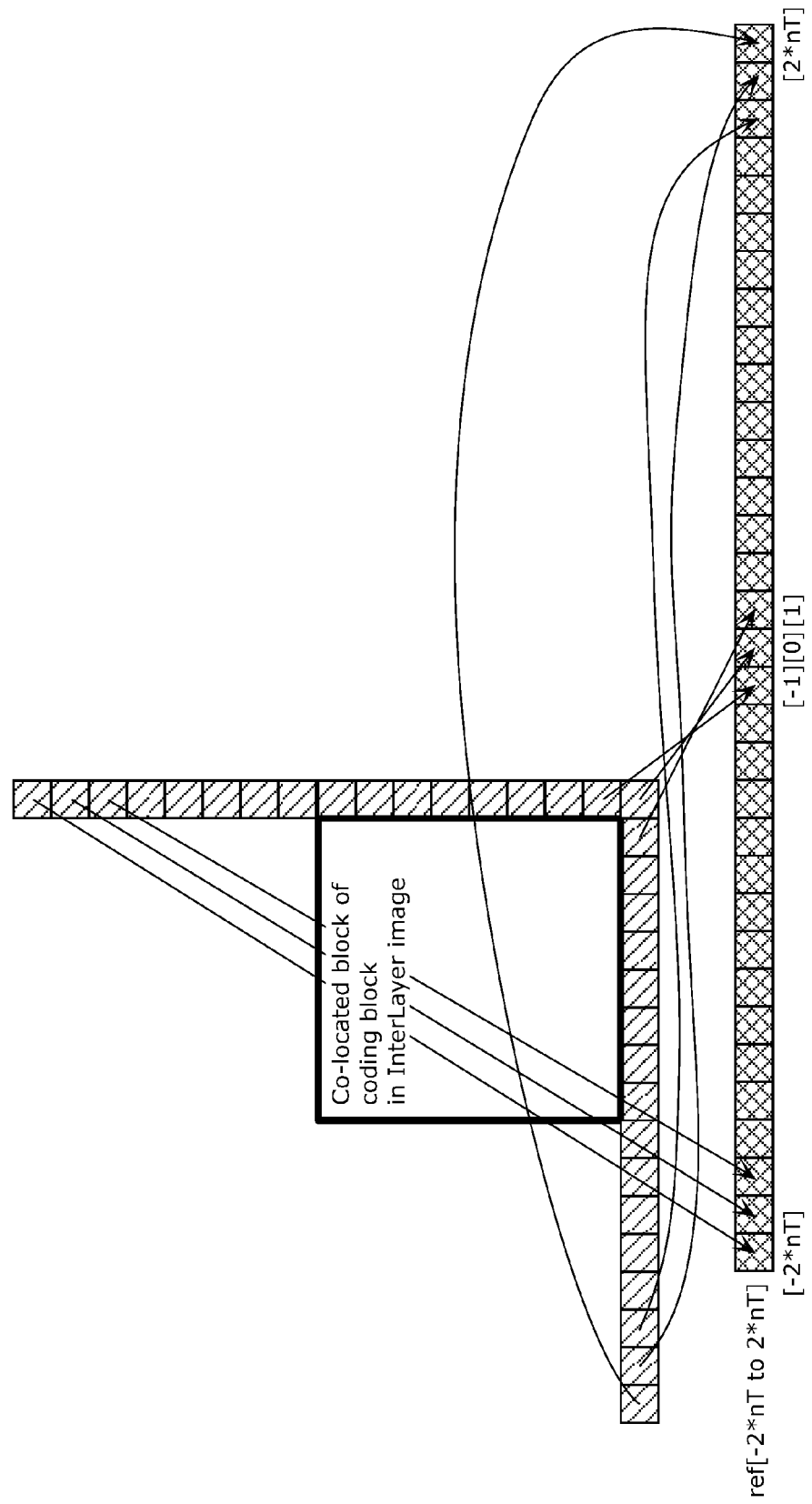
FIG. 17 is a diagram for explaining a method for calculating a prediction pixel of the Angular mode BL type according to Embodiment 1.

Moreover, as shown in FIG. 15, in the Angular mode BL type, although the bottom and right surrounding pixels of the co-located block of the coding block in the InterLayer image are stored in ref in an order from the lower left to the upper right pixels, it is possible to store it in ref from an order from the upper right to the left bottom pixels as shown in FIG. 17.

Figure 18:
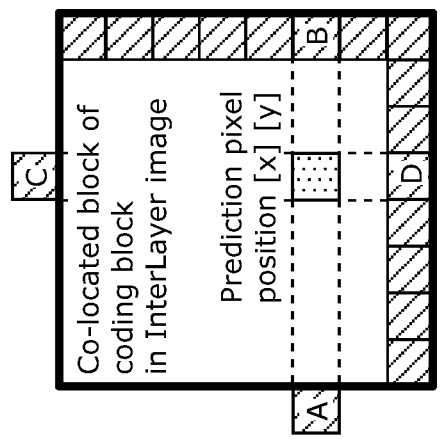
FIG. 18 is a diagram for explaining a method for calculating a prediction pixel of the Planar mode BL type according to Embodiment 1.

Moreover, in the above description, the intra prediction unit 117 generates a prediction pixel by combining the EnhancementLayer pixel with the InterLayer pixel in the Planar mode ELBL type and the DC mode ELBL type, it is possible to provide a new type which generates a prediction pixel with only the InterLayer pixel (Planar mode BL type, DC mode BL type). In other words, it is possible to provide a prediction pixel with such a type as shown in the following expressions (8) and (9) (refer to FIG. 18).

Prediction pixel of the Planar mode BL type [x][y]= ((nT-1-x)×BL[-1][y]+(x+1)×BL[nT-1][y]+(nT-1-y)×BL[x][-1]+(y+1)×BL[x][nT-1]+nT)>> (Log 2(nT)+1)    (8)

[Math. 3]

$$\text{Prediction pixel of the } DC \text{ mode } BL \text{ type } [x][y] = \left( \sum_{x'=0}^{nT-1} BL[x'][nT] + \sum_{y'=0}^{nT-1} BL[nT][y'] + nT \right) >> (\log 2(nT) + 1) \quad (9)$$

With this, prediction error can be reduced in an image having a high correlation with InterLayer, or an image having a high correlation between the current pixel and pixels in the right, bottom, and lower right directions, and the like.

Moreover, although a horizontal width of the coding block size is used as nT in the prediction pixel generation, a vertical width may be used instead of the horizontal width, and the frequency transform size or the reference block size may be used instead of the coding block size.

Moreover, in the above description, although the intra prediction unit 117 directly uses the calculated prediction pixel in the prediction pixel generation processing, a pixel value may be corrected using the surrounding reference pixels. For example, in the case of the DC mode, the intra prediction unit 117 calculates the average of the surrounding pixel values as prediction pixels for all the pixels in the coding block, the prediction pixel at the end of the coding block the prediction pixel may be corrected as shown in the following expression (10) using weighted average with the surrounding pixel adjacent to the prediction pixel (EnhancementLayer pixel or InterLayer pixel).

Prediction pixel[nT-1][nT-1]=(2×Prediction pixel [nT-1][nT-1]=BL[nT][nT-1]+BL[nT-1][nT]+ 2≥≥2    (10)

Here, although the intra prediction unit 117 corrects the right end pixel and the lower end pixel in the coding block using the InterLayer pixel adjacent to the pixel, this method may be used in prediction of the EL type. In other words, in the above description, although the intra prediction unit 117 generates a prediction pixel in the Planar mode EL type, the DC mode EL type, and the Angular mode EL type, with only the EnhancementLayer pixel, the intra prediction unit 117 may correct the prediction pixel using the InterLayer pixel. In that case, in the configuration diagram of FIG. 5, the InterLayer image is changed for input to the Planar mode EL type prediction unit 121A, the DC mode EL type prediction unit 122A, and the Angular mode EL type prediction unit 123A. Since in the prediction of the EL type, a prediction block is generated from the top, left, and upper left pixels, prediction error is likely to be large in the right, bottom, and lower right portions in the coding block. Therefore, when the intra prediction unit 117 corrects the prediction pixel using the InterLayer pixel adjacent to the prediction pixel, prediction error can be reduced. It should be noted that the intra prediction unit 117 may correct not only the pixel at the end of the block but also the prediction pixel surrounding the end of the block. The intra prediction unit 117 may correct not only the InterLayer pixel adjacent to the prediction pixel but also the InterLayer pixel which is located at the same position as that of the prediction pixel. Furthermore, the intra prediction unit 117 may correct the prediction pixel using the surrounding InterLayer pixel of the prediction pixel.

Although in the above description, the intra prediction unit 117 directly uses the pixel value of the EnhancementLayer pixel or the InterLayer pixel in the prediction image generation processing as the reference pixel, the intra prediction unit 117 may use the pixel value obtained by filtering using the surrounding pixel value. For example, when a pixel of EL [x] [y] is used, the EL' [x] [y] corrected as shown in the following expression (11) may be used.

EL'[x][y]=(EL[x-1][y]+2×EL[x][y]+EL[x+1][y]+ 2)≥≥2)    (11)

Although in the above description each of the modes can be switched between the EL type and the ELBL type (BL type), each of the modes may be fixed to any of the types. For example, it is possible to use only the ELBL type (BL type). In other words, the prediction block of the Planar mode may be always a prediction block of the Planar mode ELBL type, and the prediction block of the DC mode may be always a prediction block of the DC mode EL type.

Although in the above description, in the generation processing of a prediction pixel of the DC mode ELBL type, the intra prediction unit 117 calculates the average using all pixels adjacent to the four sides of the coding block, the average may be calculated using not by all the four sides. For example, the average may be calculated using only the upper surrounding reference pixel and the lower surrounding reference pixel. The average may be calculated using only the right surrounding reference pixel and the bottom surrounding reference pixel that are the InterLayer pixels.

Moreover, although in the present embodiment, the image encoding apparatus 100 treats the BaseLayer image as an image having a low resolution, generates the BaseLayer image by downsampling the input image, and generates the InterLayer image is generated by upsampling the BaseLayer image after encoding and decoding, the image having a low resolution may be the BaseLayer image. In other words, the input image is directly inputted to the BaseLayer encoder 102. The BaseLayer encoder 102 performs encoding by reducing the encoding amount compared with the EnhancementLayer encoder 105. Then, the BaseLayer image after encoding and decoding is directly used as the InterLayer image in the EnhancementLayer encoder 105. In that case, it is needless to say that the downsampling unit 101 (downsampling processing) and the upsampling unit 104 (upsampling processing) in FIGS. 1 and 2 are not necessary.

Moreover, although in the present embodiment, the BaseLayer encoder 102 encodes the BaseLayer image according to the method of Non Patent Literature 1, the encoding is not limited to such. For example, the encoding may be performed according to any encoding method. For example, the BaseLayer encoder 102 may encode the BaseLayer image according to the method of the H.264 video encoding standard.

Moreover, although the image encoding apparatus 100 separately outputs the BaseLayer bitstream and the EnhancementLayer bitstream, the image encoding apparatus 100 may output the BaseLayer bitstream and the EnhancementLayer bitstream by multiplexing.

Furthermore, the processing in the present embodiment may be implemented by software. The software may be distributed through download and the like. Moreover, the software may be recorded on a recording medium such as CD-ROM for distribution. It should be noted that this corresponds to other embodiments of the Specification.

Embodiment 2

The present embodiment describes an image decoding apparatus and an mage decoding method for decoding a bitstream (BaseLayer bitstream and EnhancementLayer bitstream) generated by the image encoding apparatus.

<Overall Configuration>

Figure 19:
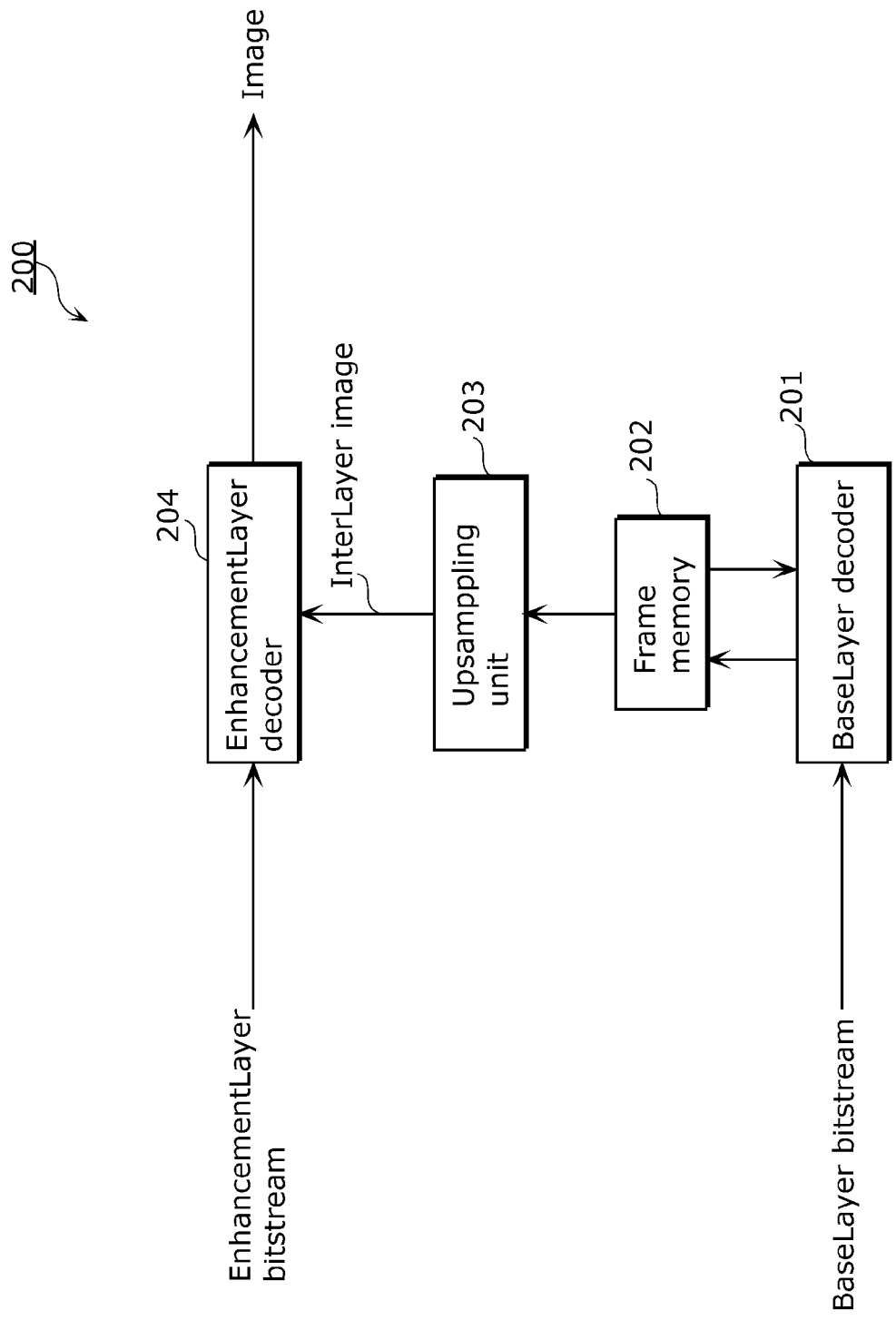
FIG. 19 is a block diagram of an image decoding apparatus according to Embodiment 2.

FIG. 19 shows a block diagram showing a configuration of an image decoding apparatus 200 according to the present embodiment. As shown in FIG. 19, the image decoding apparatus 200 includes a BaseLayer decoder 201, a frame memory 202, an upsampling unit 203, and an EnhancementLayer decoder 204.

<Operation (Overall)>

Figure 20:
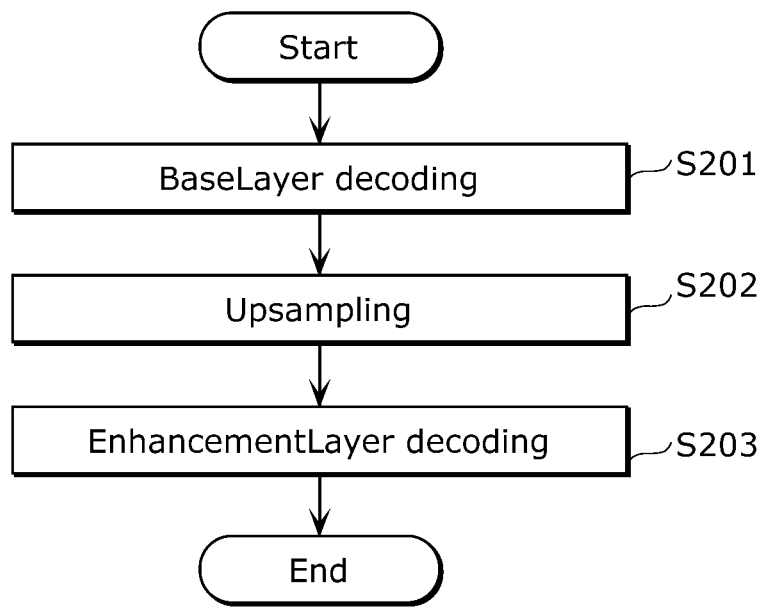
FIG. 20 is a flowchart of image decoding processing according to Embodiment 2.

Next, with reference to FIG. 20, an overall flow of the decoding processing will be described.

First, the BaseLayer decoder 201 decodes the BaseLayer image according to a method of Non Patent Literature 1 to generate a BaseLayer decoded image, and then stores the BaseLayer decoded image in the frame memory 202 (S201).

Next, the upsampling unit 203 upsamples the BaseLayer decoded image generated by the BaseLayer decoder 201, and then generates an image having the same resolution as that of the input image (InterLayer image) (S202).

Next, the EnhancementLayer decoder 204 decodes an EnhancementLayer bitstream using the InterLayer image (S203).

The following will describe the characteristic EnhancementLayer decoder 204 in detail.

<Configuration of EnhancementLayer Decoder 204>

Figure 21:
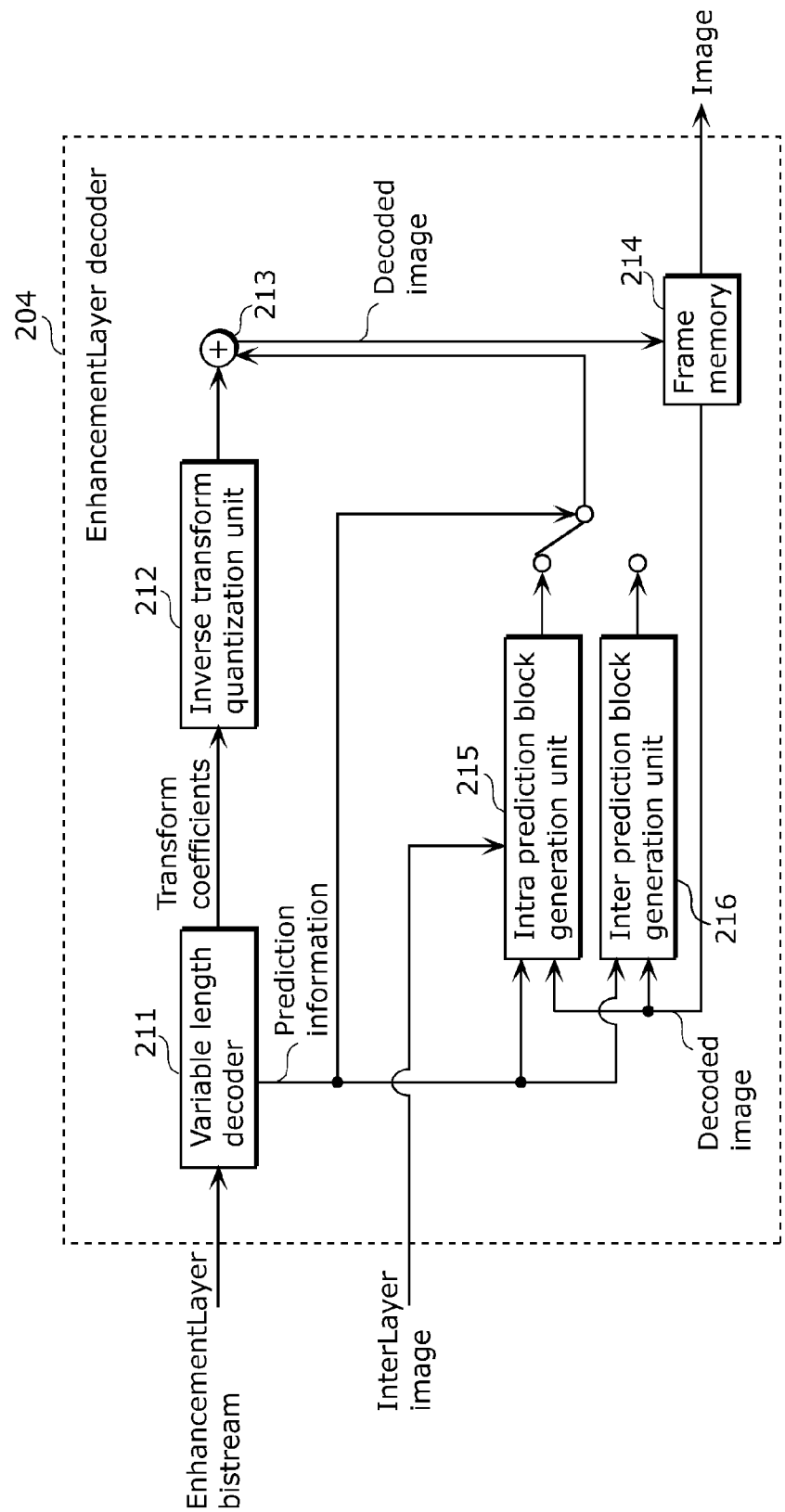
FIG. 21 is a block diagram of an EnhancementLayer decoder according to Embodiment 2.

FIG. 21 is a block diagram showing an internal configuration of the EnhancementLayer decoder 204. As shown in FIG. 21, the EnhancementLayer decoder 204 includes a variable length decoder 211, an inverse transform quantization unit 212, an adder 213, a frame memory 214, an intra prediction block generation unit 215, and an inter prediction block generation unit 216.

<Operation (EnhancementLayer Decoding>

Figure 22:
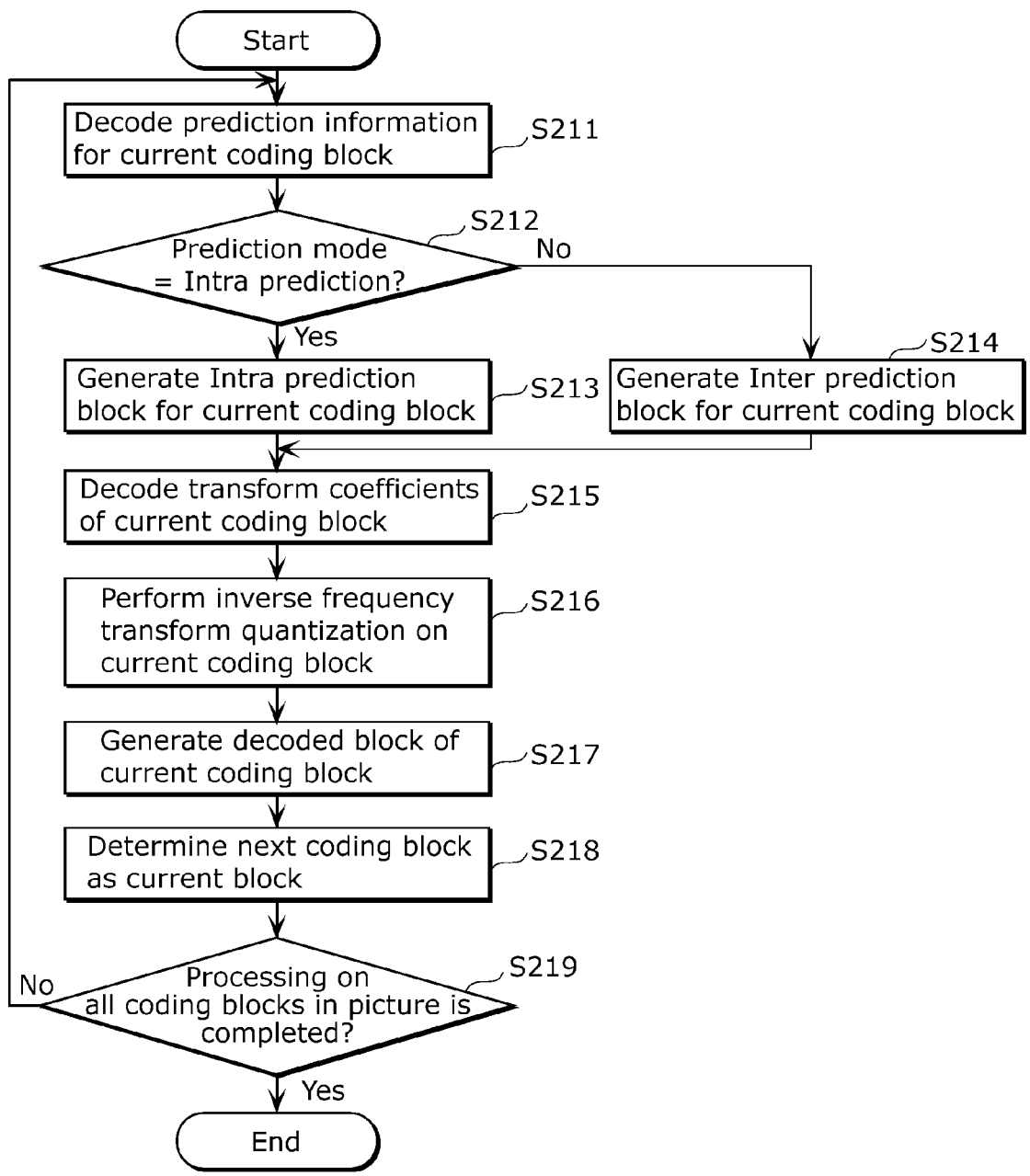
FIG. 22 is a flowchart of EnhancementLayer decoding processing according to Embodiment 2.

Next, with reference to FIG. 22, a flow of the EnhancementLayer decoding processing (S203 in FIG. 20) will be described.

First, the variable length decoder 211 decodes prediction information (S211). When the prediction mode is intra prediction (Yes in S212), the intra prediction block generation unit 215 generates a prediction block with intra prediction (S213). Meanwhile, when the prediction mode is inter prediction (No in S212), the inter prediction generation unit 216 generates a prediction block with inter prediction (S214).

Next, the variable length decoder 211 decodes transform coefficients (S215). The inverse transform quantization unit 212 performs inverse quantization and inverse frequency transform on transform coefficients to reconstruct a differential block (S216). The adder 213 generates a decoded block by adding the differential block and the prediction block (S217). The decoded block is stored in the frame memory 116 as a decoded image (EnhancementLayer decoded image).

Then, the EnhancementLayer decoder 204 shifts the process to the next coding block, and repeats S211 to S218 until the processing on all the coding blocks in the picture is completed (S218, S219).

The following will describe the characteristic intra prediction block generation unit 215 in detail.

<Configuration of Intra Prediction Block Generation Unit 215>

Figure 23:
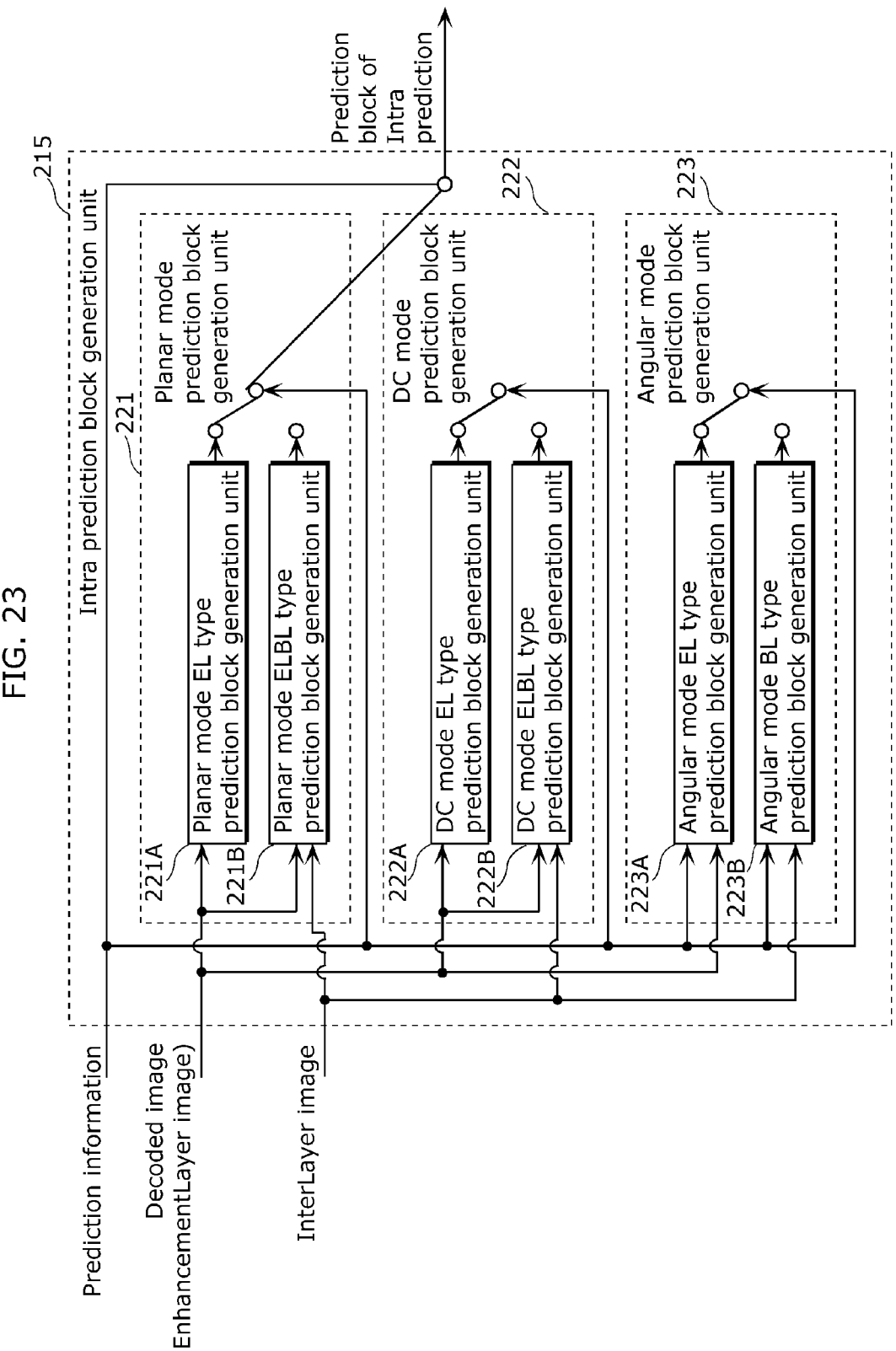
FIG. 23 is a block diagram of an intra prediction block generation unit according to Embodiment 2.

FIG. 23 is a block diagram showing an internal configuration of the intra prediction block generation unit 215. As shown in FIG. 23, the intra prediction block generation unit 217 includes a Planar mode prediction block generation unit 221, a DC mode prediction block generation unit 222, and an Angular mode prediction block generation unit 223. The Planar mode prediction block generation unit 221 includes a Planar mode EL type prediction block generation unit 221A, and a Planar mode ELBL type prediction block generation unit 221B. The DC mode prediction block generation unit 222 includes a DC mode EL type prediction block generation unit 222A, and a DC mode ELBL type prediction block generation unit 222B. The Angular mode prediction block generation unit 223 includes an Angular mode EL type prediction block generation unit 223A, and an Angular mode BL type prediction block generation unit 223B.

<Operation (Intra Prediction Block Generation)>

Figure 24:
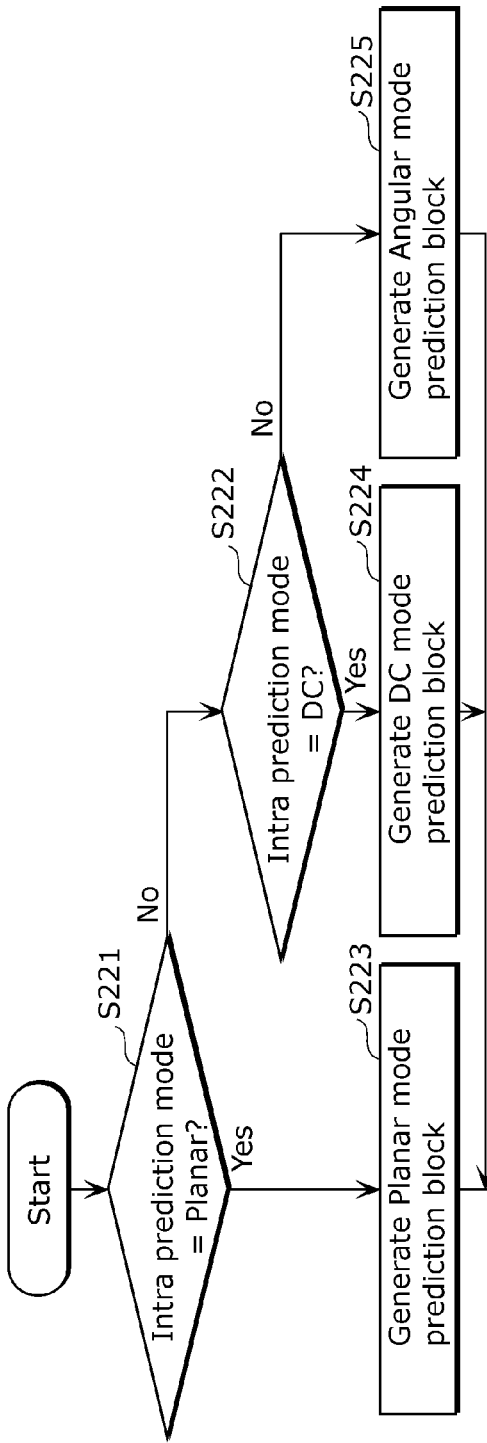
FIG. 24 is a flowchart of intra prediction block generation processing according to Embodiment 2.

Next, with reference to FIG. 24, a flow of the intra prediction block generation processing (S213 in FIG. 22) will be described.

First, when the intra prediction mode is the Planar mode (Yes in S221), the Planar mode prediction block generation unit 221 generates a prediction block with the Planar mode (S223). When the intra prediction mode is the DC mode (Yes in S222), the DC mode prediction block generation unit 222 generates a prediction block with the DC mode (S224). Otherwise (when the intra prediction mode is the Angular mode) (No in S221 and No in S222), the Angular mode prediction block generation unit 223 generates a prediction block with the Angular mode (S225).

<Operation (Planar Mode Prediction Block Generation)>

Figure 25:
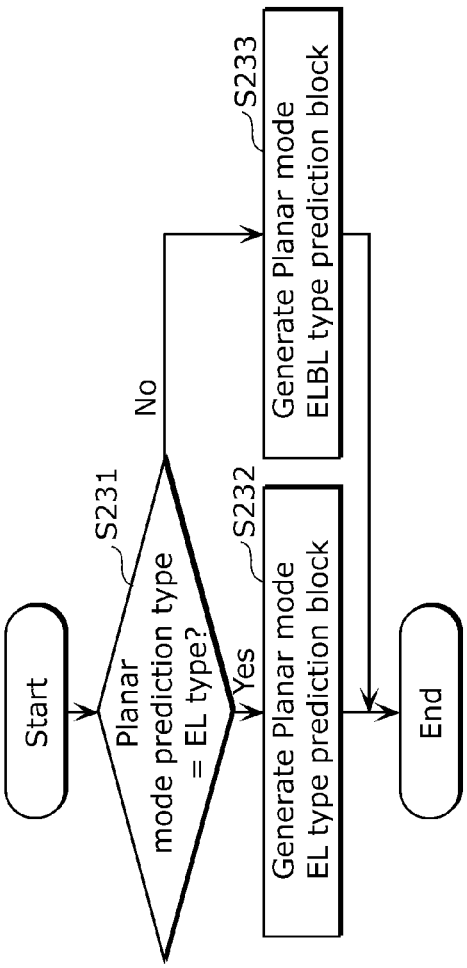
FIG. 25 is a flowchart of Planar mode prediction block generation processing according to Embodiment 2.

Next, with reference to FIG. 25, a flow of the Planar mode prediction block generation processing (S223 in FIG. 24) will be described.

First, when the Planar mode prediction type is the EL type (Yes in S231), the Planar mode EL type prediction block generation unit 221A generates a prediction block with the Planar mode EL type (S232). Otherwise (when the Planar mode prediction type is the ELBL type) (No in S231), the Planar mode ELBL type prediction block generation unit 221B generates a prediction block with the Planar mode ELBL type (S233). It should be noted that since the method for generating the prediction block is the same as that of Embodiment 1 (FIGS. 8, 9A and 9B), a description thereof will be omitted.

<Operation (DC Mode Prediction Block Generation)>

Figure 26:
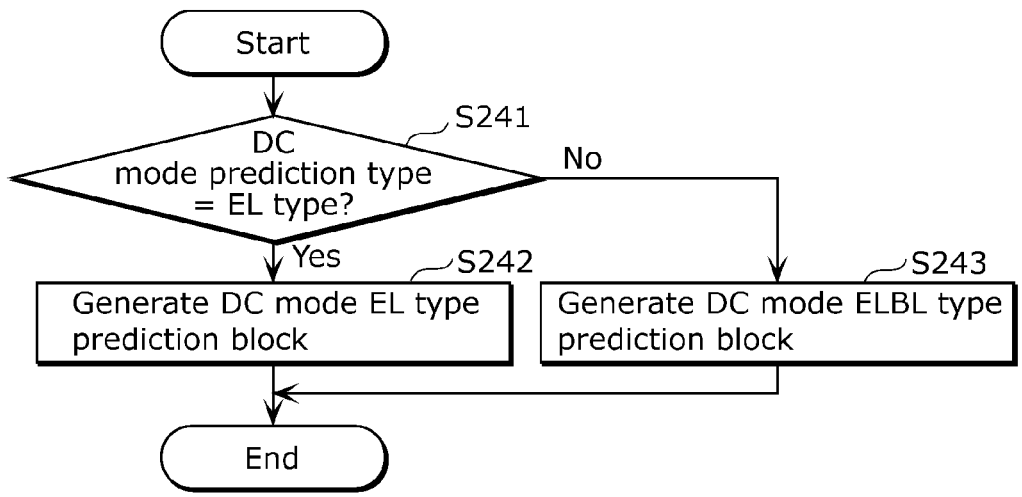
FIG. 26 is a flowchart of DC mode prediction block generation processing according to Embodiment 2.

Next, with reference to FIG. 26, a flow of the DC mode prediction block generation processing (S224 in FIG. 24) will be described.

First, when the DC mode prediction type is the EL type (Yes in S241), the DC mode EL type prediction block generation unit 222A generates a prediction block with the DC mode EL type (S242). Otherwise (when the DC mode prediction type is the ELBL type) (No in S241), the DC mode ELBL type prediction block generation unit 222B generates a prediction block with the Planar mode ELBL type (S243). It should be noted that since the method for generating the prediction block is the same as that of Embodiment 1 (FIGS. 11, 12A and 12B), a description thereof will be omitted.

<Operation (Angular Mode Prediction Block Generation)>

Figure 27:
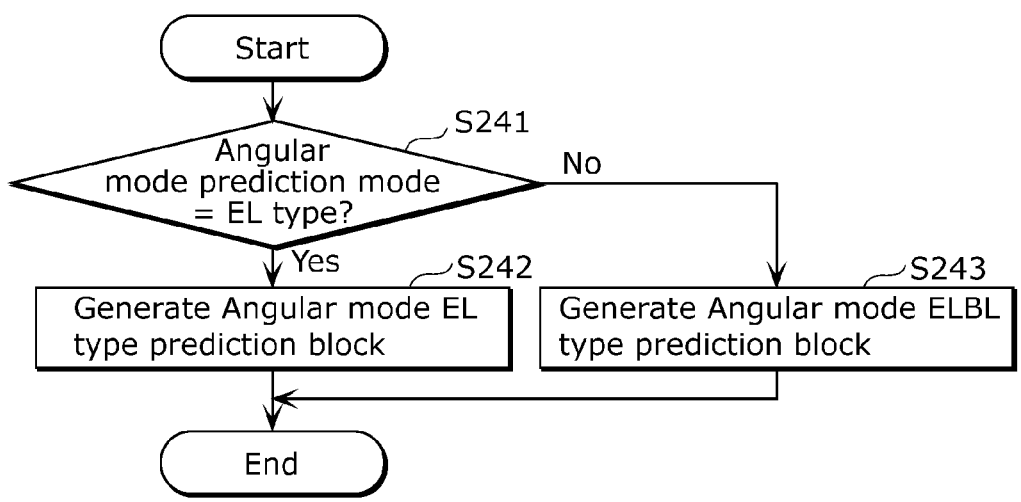
FIG. 27 is a flowchart of Angular mode prediction block generation processing according to Embodiment 2.

Next, with reference to FIG. 27, a flow of the Angular mode prediction block generation processing (S225 in FIG. 24) will be described.

First, when the Angular mode prediction type is the EL type (Yes in S251), the Angular mode EL type prediction block generation unit 223A generates a prediction block according to a prediction direction in the Angular mode EL type (S252). Otherwise (when the Angular mode prediction type is the BL type) (No in S251), the Angular mode ELBL type prediction block generation unit 223B generates a prediction block according to a prediction direction in the Angular mode BL type (S253). It should be noted that since the method for generating the prediction block is the same as that of Embodiment 1 (FIGS. 14 and 15), a description thereof will be omitted.

<Effect>

The image decoding apparatus 200 according to the present embodiment can decode a bitstream encoded by the image encoding apparatus 100 according to Embodiment 1, and can obtain the same effect as that of Embodiment 1.

In each of the embodiments, each of the functional blocks can be realized by an MPU and a memory. Moreover, the processing by each of the functional blocks can be usually realized by software (program), and the software is stored on a recording medium such as ROM. The software may be distributed through download and the like, and may be stored on a recording medium such as CD-ROM for distribution. It should be noted that it goes without saying that each of the functional blocks can be realized by hardware (dedicated circuit).

Moreover, the processing described in each of the embodiments may be realized by a single apparatus (system), or may be realized by distributed processing using a plurality of apparatuses. Moreover, the number of computers executing the program may be one or more. In other words, integrated processing or distributed processing may be performed.

As described above, the BaseLayer encoder 102 included in the image encoding apparatus 100 generates a first bitstream (BaseLayer bitstream) by encoding the input image, and generates a first decoded image (BaseLayer decoded image or InterLayer decoded image) by encoding and decoding the input image. The EnhancementLayer encoder 105 generates a second bitstream (EnhancementLayer bitstream) by encoding the input image using the first decoded image, and generates a second decoded image (EnhancementLayer decoded image) by encoding and decoding the input image.

Here, the second decoded image has resolution or image quality higher than that of the first decoded image. For example, as described above, the first decoded image is an image obtained by encoding and decoding the input image after the input image is downsampled. Moreover, the BaseLayer encoder 102 may generate the first decoded image having image quality lower than that of the second decoded image by encoding with image quality lower than that of the EnhancementLayer encoder 105.

Moreover, the EnhancementLayer encoder 105 includes an intra prediction unit 117 which generates a prediction block for the current block by intra prediction. The intra prediction unit 117 generates a prediction block using pixels included in the second decoded image as the top and left reference pixels for the current block, and using pixels included in the first decoded pixel as the right and bottom reference pixels for the current block.

Specifically, intra prediction includes a Planar mode, a DC mode, and an Angular mode. In the Planar mode, a prediction pixel of the current pixel is generated by using the reference pixels of an upper direction, a left direction, a lower direction, and a right direction of the current pixel included in the current block. In the DC mode, prediction pixels of the pixels included in the current block are generated using average of the reference pixels adjacent to the current block. In the Angular mode, a prediction pixel of the current pixel is generated using a reference pixel located in a prediction direction of the current pixel included in the current block.

The intra prediction unit 117, in the Planar mode, generates a prediction pixel using (i) pixels that are in an upper direction and a left direction of the current pixel and are included in the second decoded image as the reference pixel of an upper direction and a left direction of the current pixel, and (ii) pixels in a right direction and a lower direction of a co-located pixel of the current pixel and are included in the first decoded image, as the reference pixel of a right direction and a lower direction of the current pixel.

Moreover, the intra prediction unit 117, in the DC mode, generates a prediction image using average of (i) the reference pixels adjacent to an upper direction and a left direction of the current block that are included in the second decoded image and (ii) the reference pixels that are adjacent to a right direction and a lower direction of the co-located block of the current block and are included in the second decoded pixel.

Moreover, the intra prediction unit 117, in the Angular mode, generates a prediction pixel using (i) the reference pixels that are in an upper direction, a left direction, a lower left direction, and a upper right direction of the current block and are included in the second decoded image, and (ii) the reference pixels that are in a right direction, a lower direction, an upper right direction, and a lower left direction of the co-located block of the current block and are included in the first decoded image.

Moreover, the intra prediction unit 117 may generate prediction pixels of the pixels included in the current block, and may correct, among the generated prediction pixels, prediction pixels of the right end and the lower end of the current block using a pixel that is included in the first decoded image and is located at the same position or a surrounding area.

Moreover, the BaseLayer decoder 201 included in the image decoding apparatus 200 generates a first decoded image (BaseLayer decoded image or InterLayer image) by decoding the first bitstream (BaseLayer bitstream). The EnhancementLayer decoder 204 generates the second decoded image (EnhancementLayer decoded image) by decoding the second bitstream (EnhancementLayer bitstream) using the first decoded image. The first bitstream and the second bitstream are, for example, the first bitstream and the second bitstream generated by the image encoding apparatus 100.

Here, the second decoded image has resolution or image quality higher than that of the first decoded image.

The EnhancementLayer decoder 204 includes an intra prediction block generation unit 215 which generates a prediction block for the current block by intra prediction.

The intra prediction block generation unit 215 generates a prediction block using pixels included in the second decoded image as the top and left reference pixels for the current block, and using pixels included in the first decoded pixel as the right and bottom reference pixels for the current block.

Specifically, the intra prediction block generation unit 215, in the Planar mode, generates a prediction pixel using (i) pixels in an upper direction and a left direction of the current pixel that are included in the second decoded image as the reference pixels of an upper direction and a left direction of the current pixel, and (ii) pixels that are included in the first decoded image and are in a right direction and a lower direction of a co-located pixel of the current pixel, as the reference pixel of a right direction and a lower direction of the current pixel.

Moreover, the intra prediction block generation unit 215, in the DC mode, generates a prediction image using average of (i) the reference pixels that are adjacent to an upper direction and a left direction of the current block and are included in the second decoded image and (ii) the reference pixels that are adjacent to a right direction and a lower direction of the co-located block of the current block and are included in the second decoded pixel.

Moreover, the intra prediction block generation unit 215, in the Angular mode, generates a prediction pixel using (i) the reference pixels that are in an upper direction, a left direction, a lower left direction, and an upper right direction of the current block and are included in the second decoded image, and (ii) the reference pixels that are a right direction, a lower direction, an upper right direction, and a lower left direction of the co-located block of the current block and are included in the first decoded image.

Moreover, the intra prediction block generation unit 215 may generate prediction pixels of the pixels included in the current block, and may correct, among the generated prediction pixels, prediction pixels of the right end and the lower end of the current block using pixels that are included in the first decoded image and are located at the same position or a surrounding area.

Although the image encoding method and the image decoding method according to one exemplary embodiment have been described, the present disclosure is not limited to the embodiment.

Moreover, each of the processing units included in the image encoding apparatus and the image decoding apparatus according to the present embodiment is realized as LSI that is an integrated circuit. These may be made into one chip, and a part or all of these may be made into one chip.

Moreover, ways to achieve integration are not limited to the LSI, and a special circuit or a general purpose processor and so forth can also achieve the integration. Field Programmable Gate Array (FPGA) that can be programmed after manufacturing LSI or a reconfigurable processor that allows re-configuration of the connection or configuration of LSI can be used for the same purpose.

In the above embodiments, each of the constituent elements may be configured by dedicated hardware, and may be realized by executing a software program suitable for each of the constituent elements. Each of the constituent elements may be realized by reading and executing a software program which records a program execution unit such as CPU or a processor on a recording medium such as hard disk or a semiconductor memory.

In other words, the image encoding apparatus and the image decoding apparatus include a processing circuitry and a storage which is electrically connected to the processing circuitry (is accessible from the processing circuitry). The processing circuitry includes at least one of dedicated hardware and the program execution unit. Moreover, the storage stores a software program executed by the program execution unit when the processing circuitry includes the program execution unit. The processing circuitry performs, using the storage, the image encoding method or the image decoding method according to the above embodiments.

Furthermore, the present disclosure may be the software program, and a non-transitory computer readable recording medium having a program recorded thereon. Moreover, it goes without saying that the program can distributed via a transmission medium such as the Internet.

Moreover, the figures used above are mere example for explaining the present disclosure in detail, and the present disclosure is not limited by the exemplified figures.

Moreover, the division of functional block in a block diagram is mere example. The functional blocks may be realized as a functional block, a functional block may be divided into a plurality of functional blocks, and part of the function may be shifted to another functional block. Moreover, the functions of functional blocks having similar functions may be processed in series and a time-division manner by a piece of hardware or a piece of software.

Moreover, a sequence of steps included in the image encoding method or the image decoding method is mere example for explaining the present disclosure in detail. This means that other sequences other than the above described sequence are acceptable. Moreover, part of the above steps may be simultaneously performed (in parallel) along with other steps.

Although the image encoding method and the image decoding method according to one or more exemplary embodiments have been described, the present disclosure is not limited to the embodiment. The herein disclosed subject matter is to be considered descriptive and illustrative only, and the appended Claims are of a scope intended to cover and encompass not only the particular embodiments disclosed, but also equivalent structures, methods, and/or uses.

Embodiment 3

The processing described in each of embodiments can be simply implemented in an independent computer system, by recording, in a recording medium, one or more programs for implementing the configurations of the moving picture encoding method (image encoding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture encoding method (image encoding method) and the moving picture decoding method (image decoding method) described in each of embodiments and systems using thereof will be described. The system has a feature of having an image coding apparatus that includes an image encoding apparatus using the image encoding method and an image decoding apparatus using the image decoding method. Other configurations in the system can be changed as appropriate depending on the cases.

Figure 28:
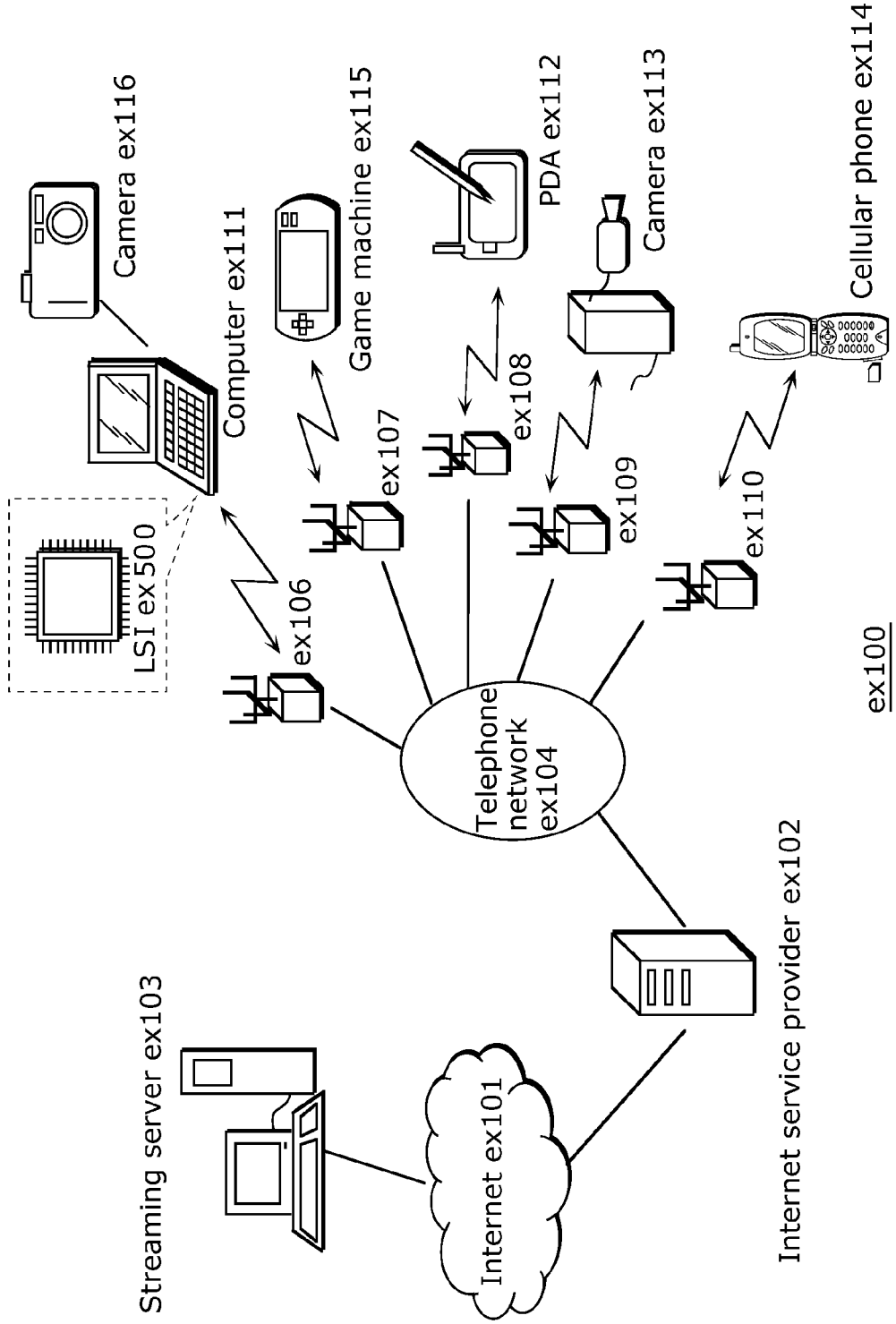
FIG. 28 shows an overall configuration of a content providing system for implementing content distribution services.

FIG. 28 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 28, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is encoded as described above in each of embodiments (i.e., the camera functions as the image encoding apparatus according to an aspect of the present disclosure), and the encoded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned encoded data. Each of the devices that have received the distributed data decodes and reproduces the encoded data (i.e., functions as the image decoding apparatus according to an aspect of the present disclosure).

The captured data may be encoded by the camera ex113 or the streaming server ex103 that transmits the data, or the encoding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The encoding processes may be performed by the camera ex116, the computer ex111, or the streaming server ex103, or shared among them.

Furthermore, the coding processes may be performed by an LSI ex500 generally included in each of the computer ex111 and the devices. The LSI ex500 may be configured of a single chip or a plurality of chips. Software for coding video may be integrated into some type of a recording medium (such as a CD-ROM, a flexible disk, and a hard disk) that is readable by the computer ex111 and others, and the coding processes may be performed using the software. Furthermore, when the cellular phone ex114 is equipped with a camera, the video data obtained by the camera may be transmitted. The video data is data encoded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the encoded data in the content providing system ex100. In other words, the clients can receive and decode information transmitted by the user, and reproduce the decoded data in real time in the content providing system ex100, so that the user who does not have any particular right and equipment can implement personal broadcasting.

Figure 29:
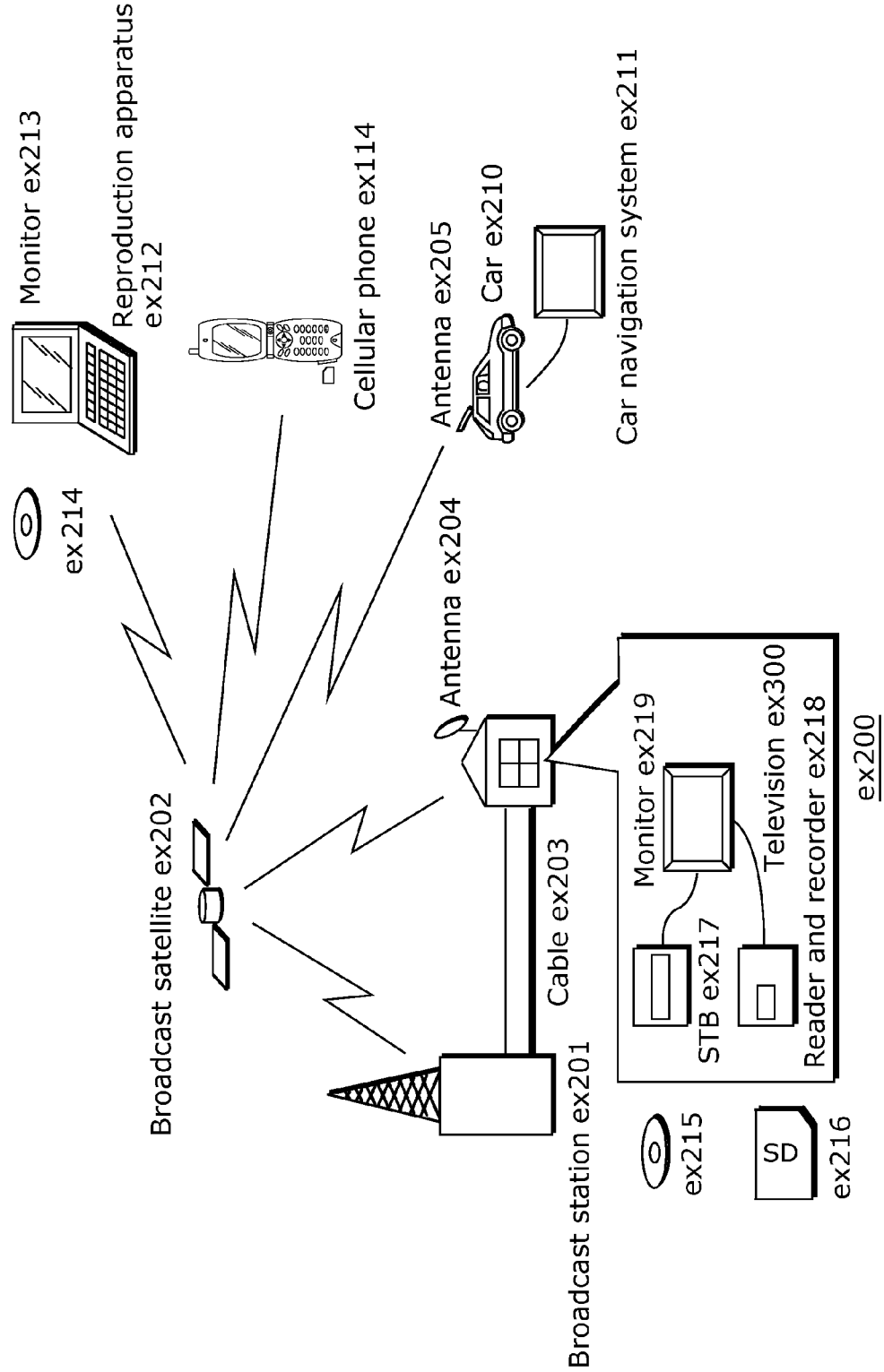
FIG. 29 shows an overall configuration of a digital broadcasting system.

Aside from the example of the content providing system ex100, at least one of the moving picture coding apparatus (image coding apparatus) described in each of embodiments may be implemented in a digital broadcasting system ex200 illustrated in FIG. 29. More specifically, a broadcast station ex201 communicates or transmits, via radio waves to a broadcast satellite ex202, multiplexed data obtained by multiplexing audio data and others onto video data. The video data is data encoded by the moving picture encoding method described in each of embodiments (i.e., data encoded by the image encoding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) encodes video signals in the recording medium ex215, and in some cases, writes data obtained by multiplexing an audio signal on the encoded data. The reader/recorder ex218 can include the moving picture decoding apparatus or the moving picture encoding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 30:
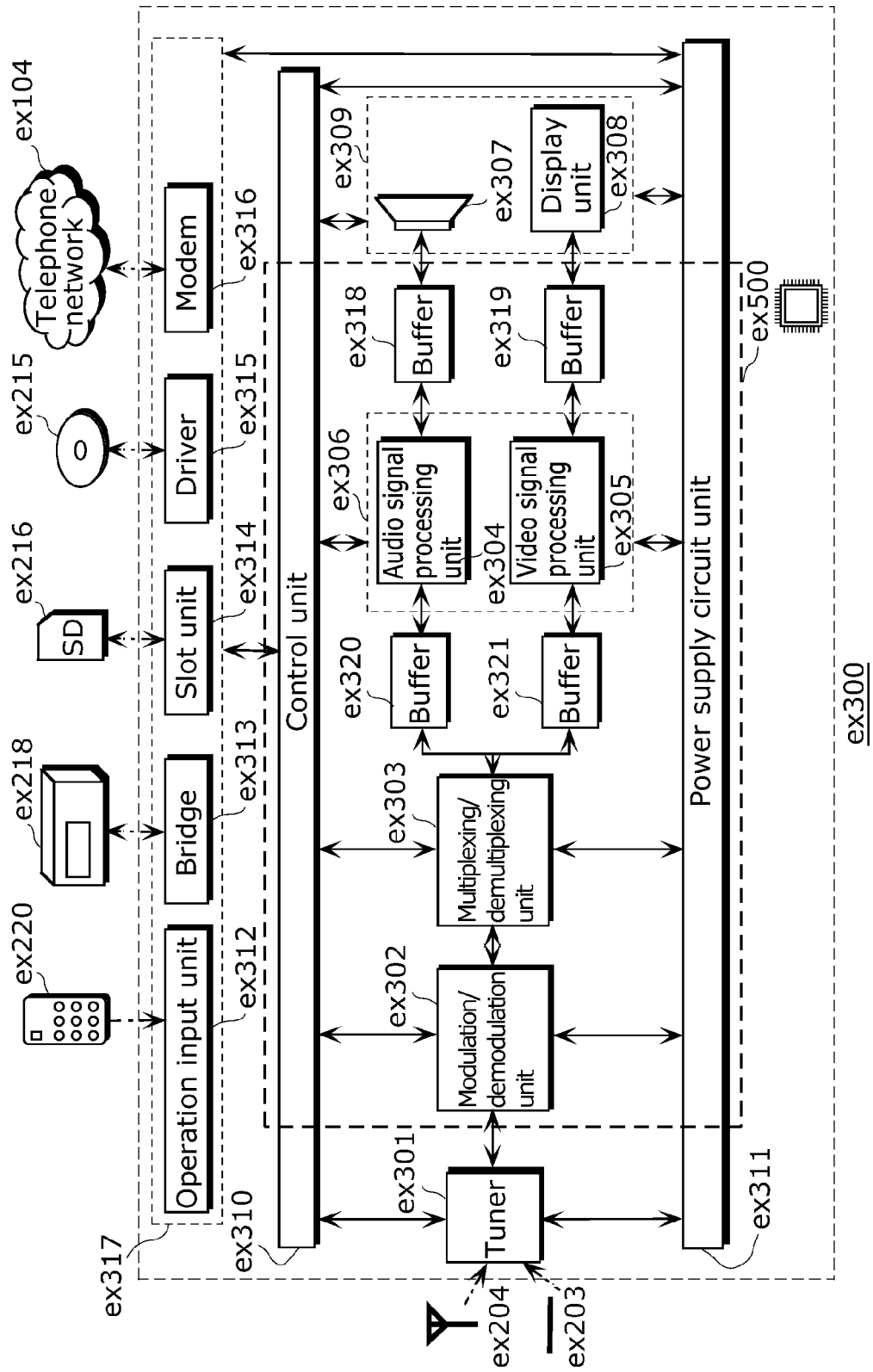
FIG. 30 shows a block diagram illustrating an example of a configuration of a television.

FIG. 30 illustrates the television (receiver) ex300 that uses the moving picture encoding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data encoded by a signal processing unit ex306 into data.

The television ex300 further includes: a signal processing unit ex306 including an audio signal processing unit ex304 and a video signal processing unit ex305 that code each of audio data and video data, (which function as the image coding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 encodes an audio signal and a video signal, and transmits the data outside or writes the data on a recording medium will be described. In the television ex300, upon a user operation through the remote controller ex220 and others, the audio signal processing unit ex304 encodes an audio signal, and the video signal processing unit ex305 encodes a video signal, under control of the control unit ex310 using the encoding method described in each of embodiments. The multiplexing/demultiplexing unit ex303 multiplexes the encoded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may encode the obtained data. Although the television ex300 can encode, multiplex, and provide outside data in the description, it may be capable of only receiving, decoding, and providing outside data but not the encoding, multiplexing, and providing outside data.

Furthermore, when the reader/recorder ex218 reads or writes multiplexed data from or on a recording medium, one of the television ex300 and the reader/recorder ex218 may code the multiplexed data, and the television ex300 and the reader/recorder ex218 may share the coding partly.

Figure 31:
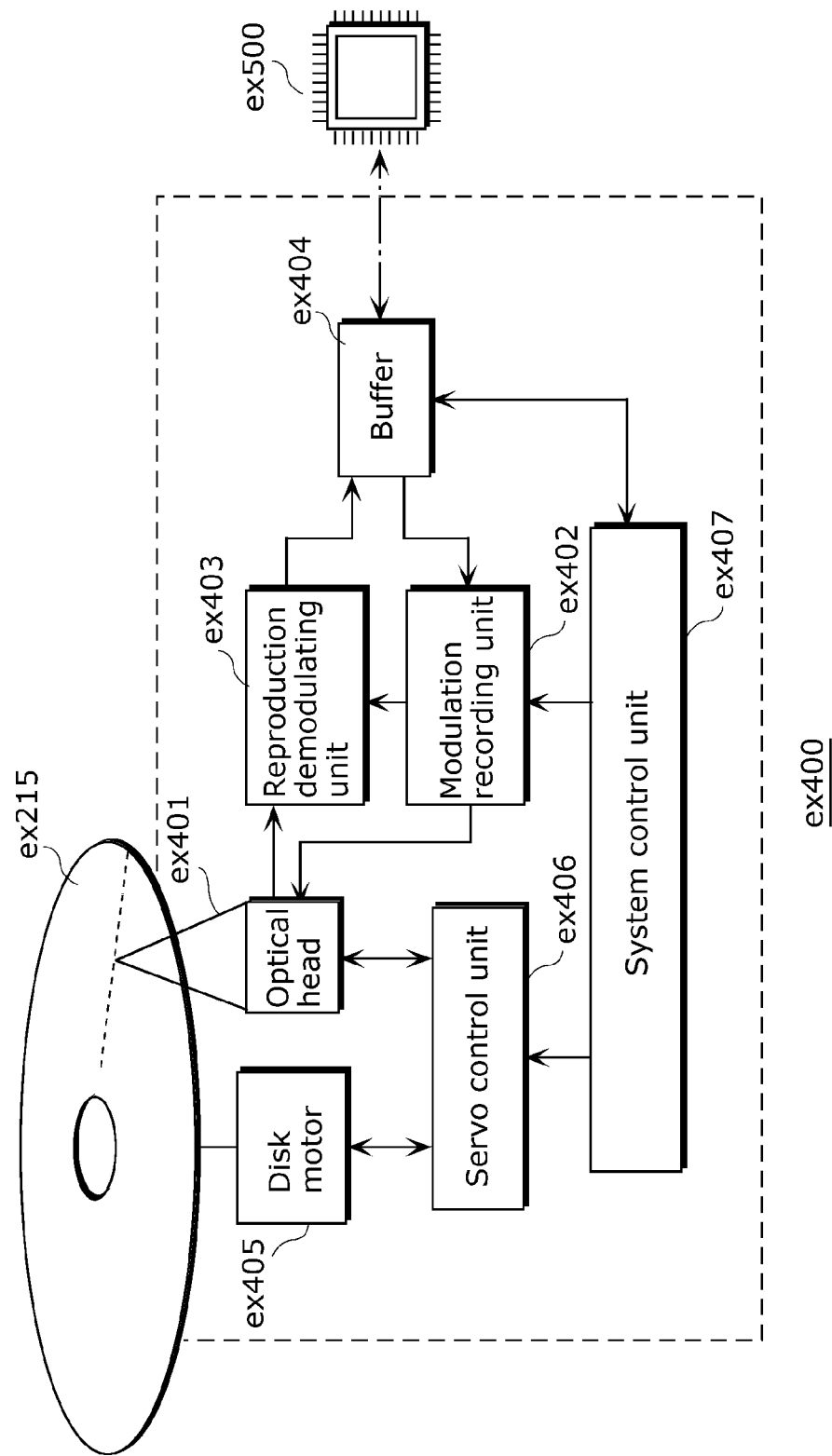
FIG. 31 shows a block diagram illustrating an example of a configuration of an information reproducing/recording unit that reads and writes information from and on a recording medium that is an optical disk.

As an example, FIG. 31 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 32:
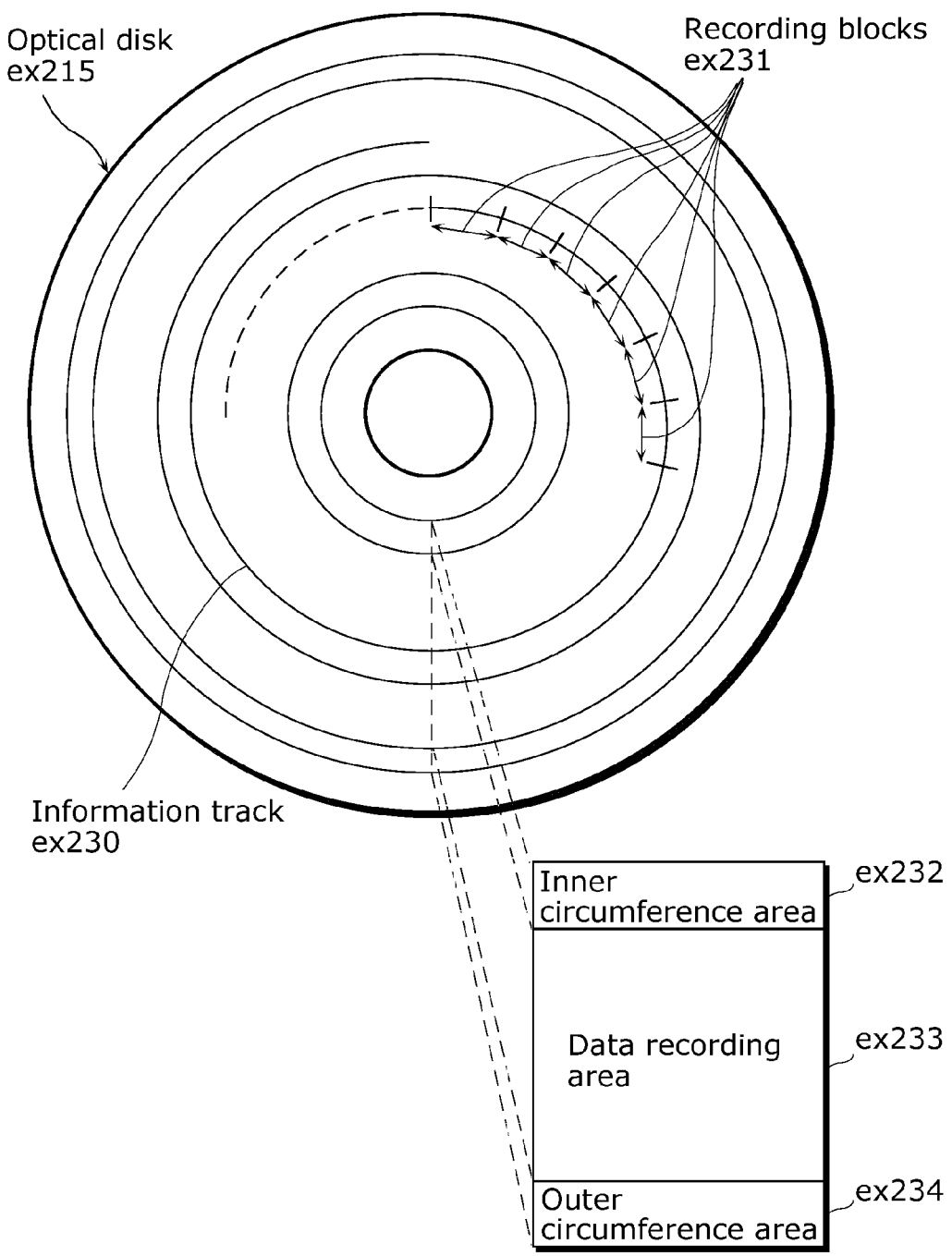
FIG. 32 shows an example of a configuration of a recording medium that is an optical disk.

FIG. 32 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes encoded audio, encoded video data, or multiplexed data obtained by multiplexing the encoded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 112. The same will be true for the configuration of the computer ex111, the cellular phone ex114, and others.

Figure 33A:
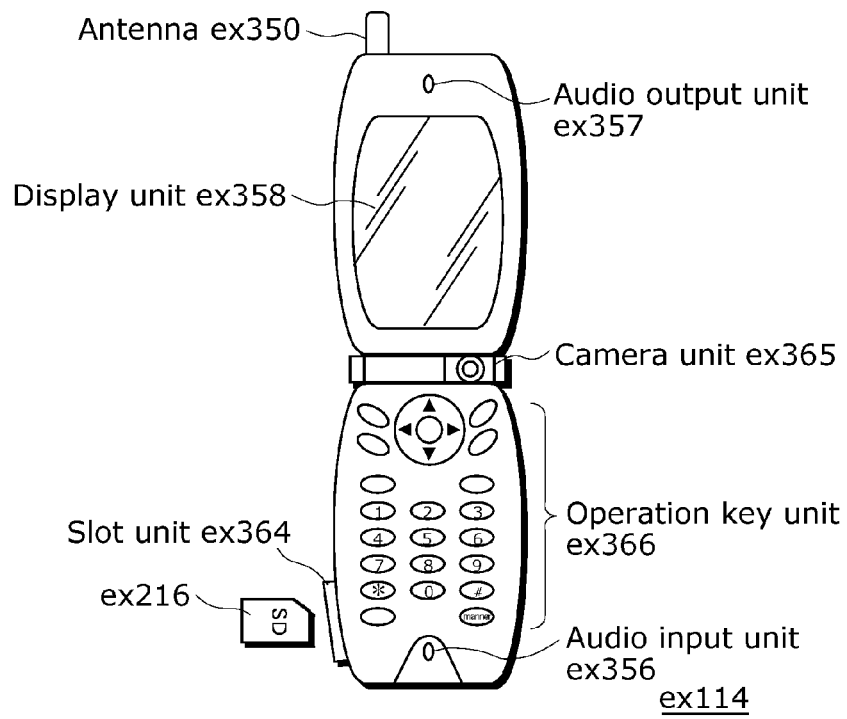
FIG. 33A shows an example of a cellular phone.

FIG. 33A illustrates the cellular phone ex114 that uses the moving picture coding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded data of the received video, the still pictures, e-mails, or others; and a slot unit ex364 that is an interface unit for a recording medium that stores data in the same manner as the memory unit ex367.

Figure 33B:
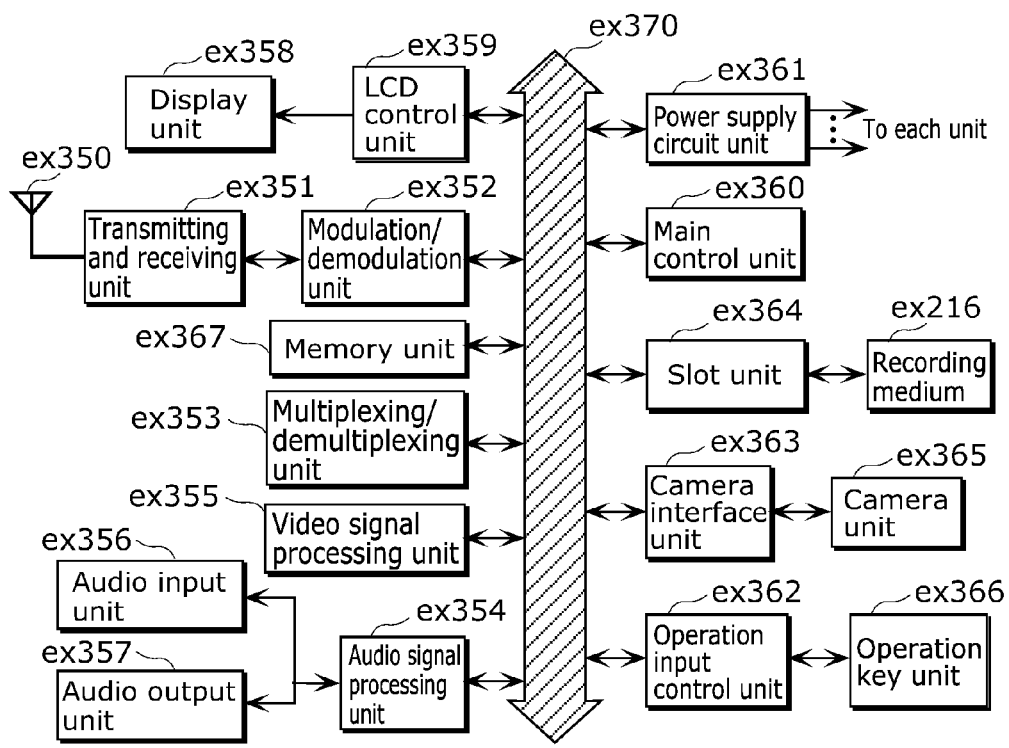
FIG. 33B is a block diagram showing an example of a configuration of a cellular phone.

Next, an example of a configuration of the cellular phone ex114 will be described with reference to FIG. 33B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and encodes video signals supplied from the camera unit ex365 using the moving picture encoding method shown in each of embodiments (i.e., functions as the image encoding apparatus according to the aspect of the present disclosure), and transmits the encoded video data to the multiplexing/demultiplexing unit ex353. In contrast, during when the camera unit ex365 captures video, still images, and others, the audio signal processing unit ex354 encodes audio signals collected by the audio input unit ex356, and transmits the encoded audio data to the multiplexing/demultiplexing unit ex353.

The multiplexing/demultiplexing unit ex353 multiplexes the encoded video data supplied from the video signal processing unit ex355 and the encoded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the encoded video data and the audio signal processing unit ex354 with the encoded audio data, through the synchronous bus ex370. The video signal processing unit ex355 decodes the video signal using a moving picture decoding method corresponding to the moving picture encoding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both an encoding apparatus and a decoding apparatus, but also (ii) a transmitting terminal including only an encoding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method in each of embodiments can be used in any of the devices and systems described. Thus, the advantages described in each of embodiments can be obtained.

Furthermore, various modifications and revisions can be made in any of the embodiments in the present disclosure.

Embodiment 4

Video data can be generated by switching, as necessary, between (i) the moving picture encoding method or the moving picture encoding apparatus shown in each of embodiments and (ii) a moving picture encoding method or a moving picture encoding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, an appropriate decoding method cannot be selected.

In view of this, multiplexed data obtained by multiplexing audio data and others onto video data has a structure including identification information indicating to which standard the video data conforms. The specific structure of the multiplexed data including the video data generated in the moving picture encoding method and by the moving picture encoding apparatus shown in each of embodiments will be hereinafter described. The multiplexed data is a digital stream in the MPEG-2 Transport Stream format.

FIG. 34 illustrates a structure of the multiplexed data. As illustrated in FIG. 34, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is encoded in the moving picture encoding method or by the moving picture encoding apparatus shown in each of embodiments, or in a moving picture encoding method or by a moving picture encoding apparatus in conformity with a conventional standard, such as MPEG-2, MPEG-4 AVC, and VC-1. The audio stream is encoded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 35:
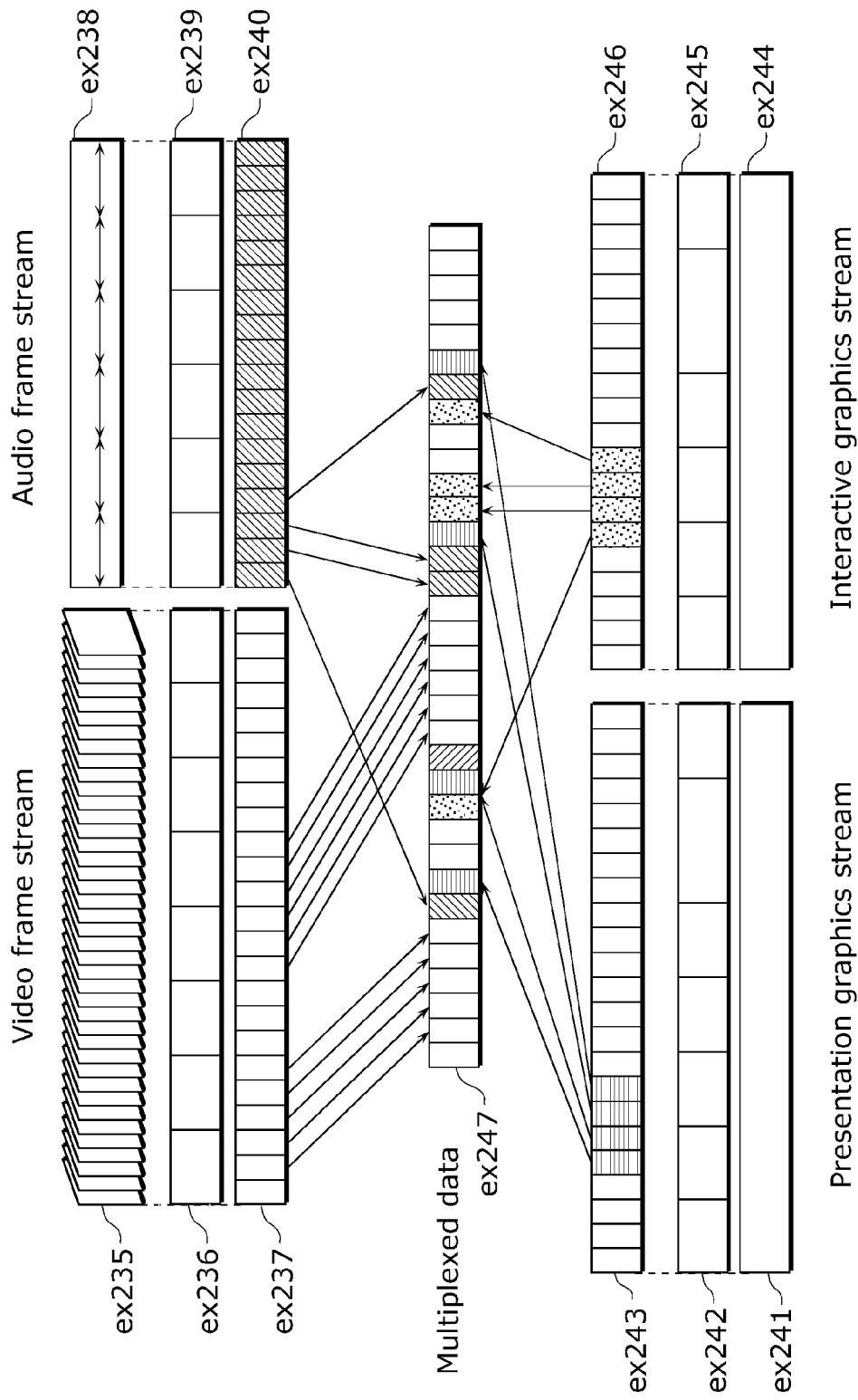
FIG. 35 schematically shows how each stream is multiplexed in multiplexed data.

FIG. 35 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 36:
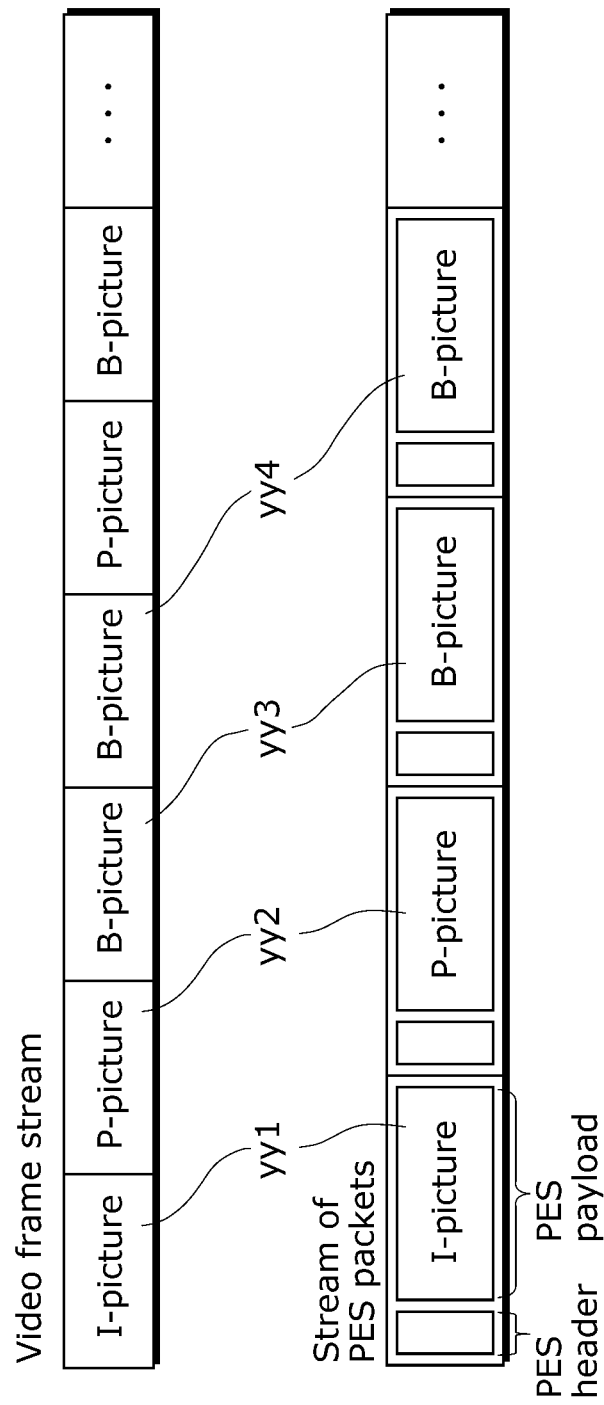
FIG. 36 shows how a video stream is stored in a stream of PES packets in more detail.

FIG. 36 illustrates how a video stream is stored in a stream of PES packets in more detail. The first bar in FIG. 118 shows a video frame stream in a video stream. The second bar shows the stream of PES packets. As indicated by arrows denoted as yy1, yy2, yy3, and yy4 in FIG. 118, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 37:
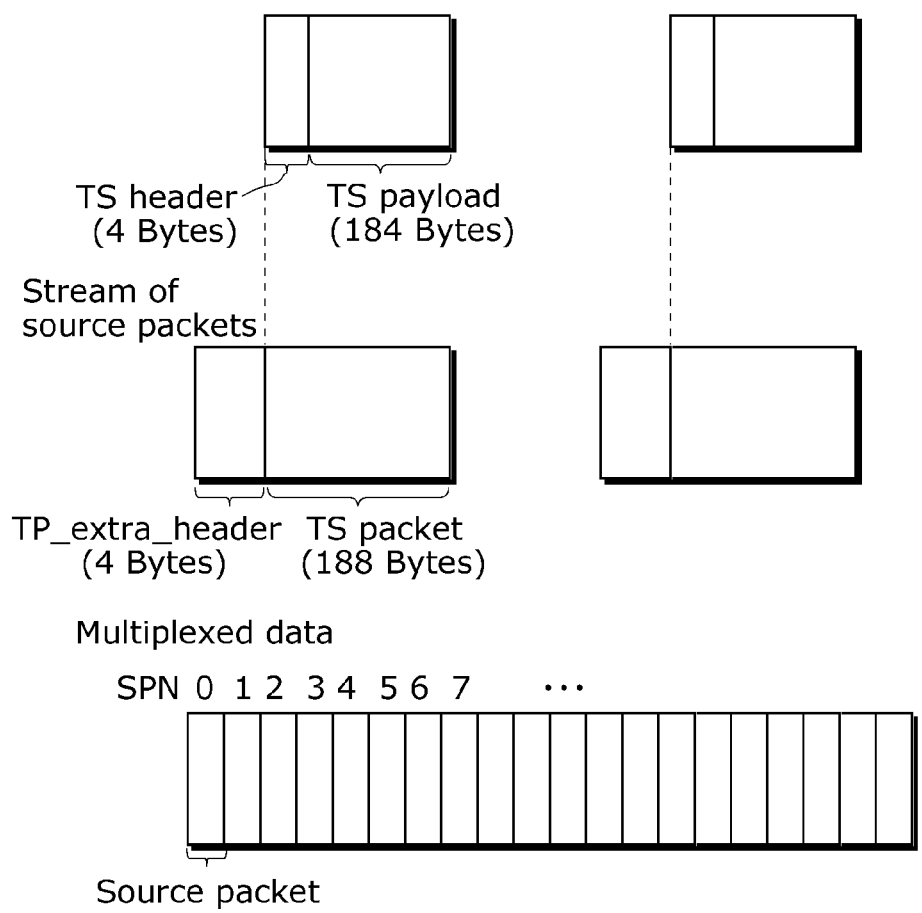
FIG. 37 shows a structure of TS packets and source packets in the multiplexed data.

FIG. 37 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 37. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 38:
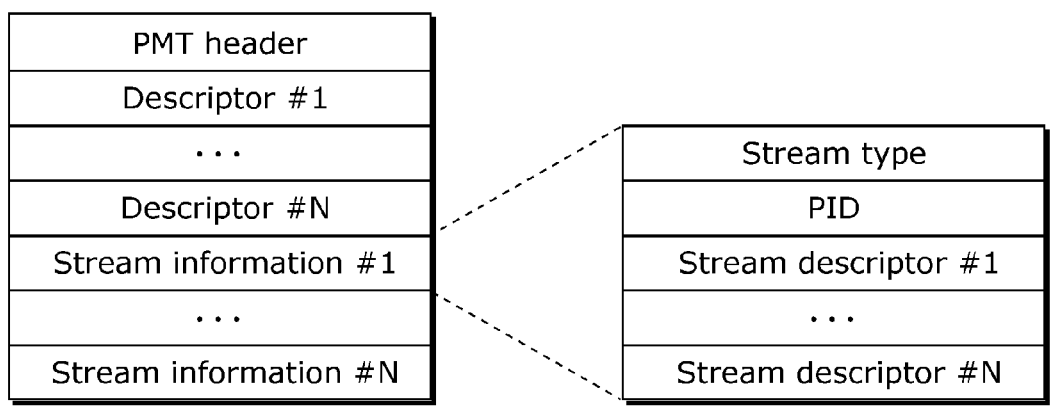
FIG. 38 shows a data structure of a PMT.

FIG. 38 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 39:
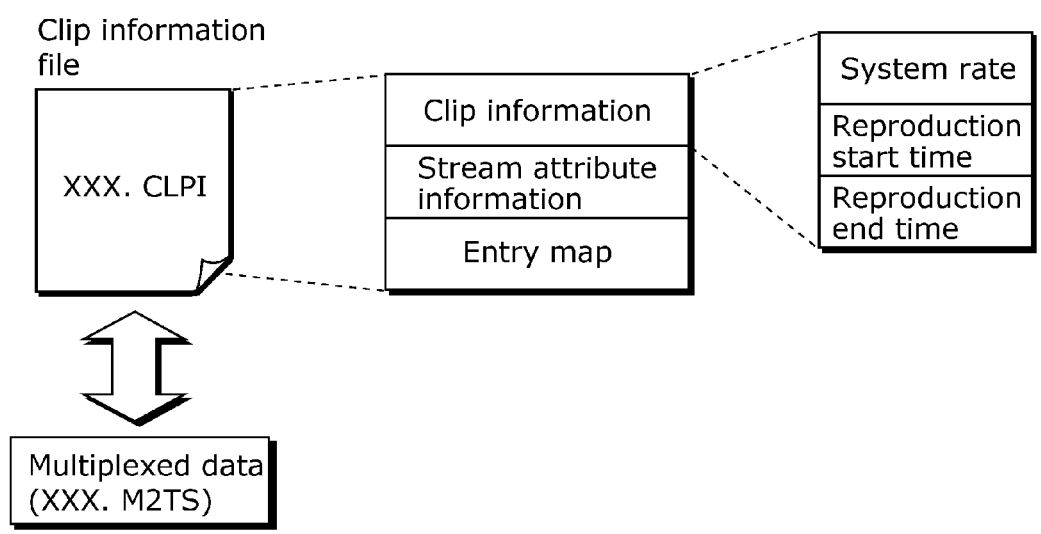
FIG. 39 shows an internal structure of multiplexed data information.

Each of the multiplexed data information files is management information of the multiplexed data as shown in FIG. 39. The multiplexed data information files are in one to one correspondence with the multiplexed data, and each of the files includes multiplexed data information, stream attribute information, and an entry map.

As illustrated in FIG. 39, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 40:
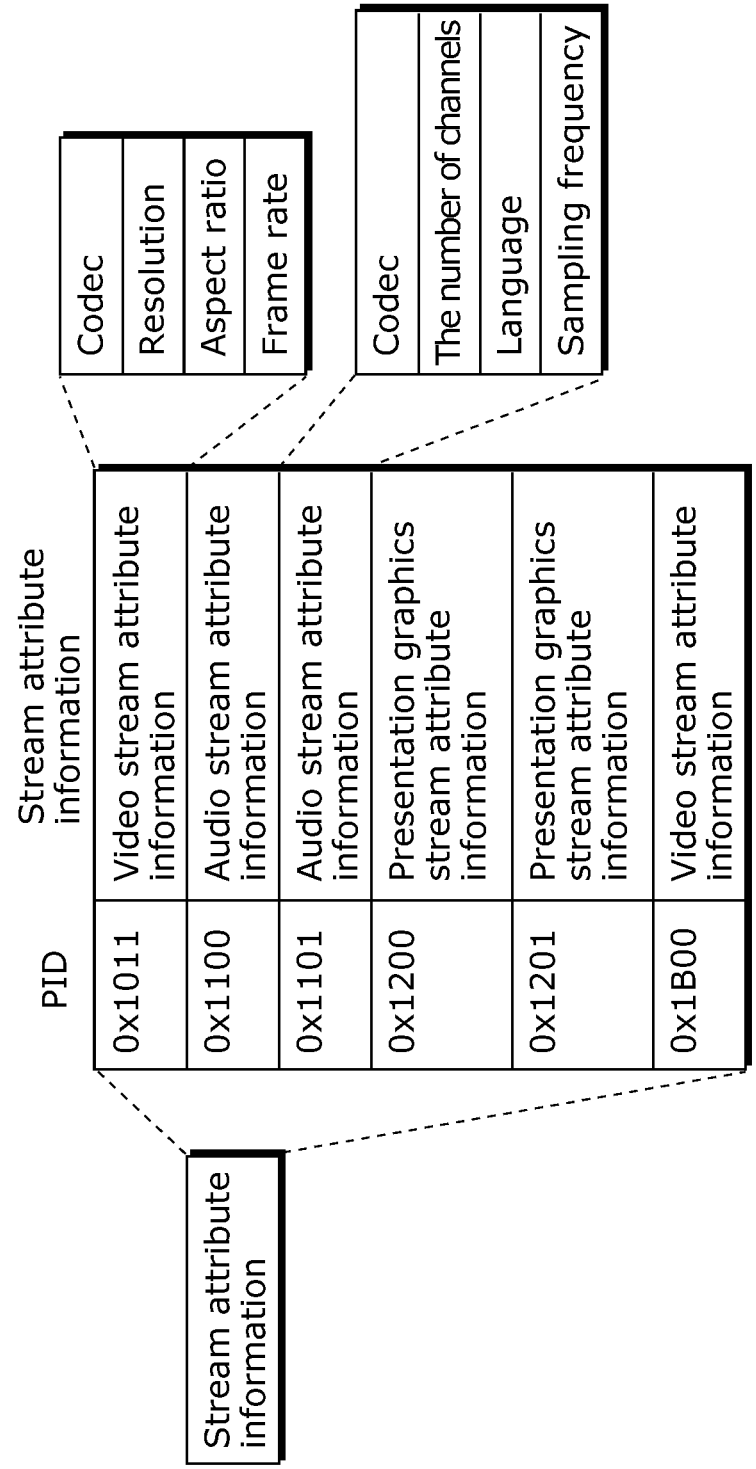
FIG. 40 shows an internal structure of stream attribute information.

As shown in FIG. 40, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture encoding method or the moving picture encoding apparatus described in each of embodiments includes a step or a unit for allocating unique information indicating video data generated by the moving picture encoding method or the moving picture encoding apparatus in each of embodiments, to the stream type included in the PMT or the video stream attribute information. With the configuration, the video data generated by the moving picture encoding method or the moving picture encoding apparatus described in each of embodiments can be distinguished from video data that conforms to another standard.

Figure 41:
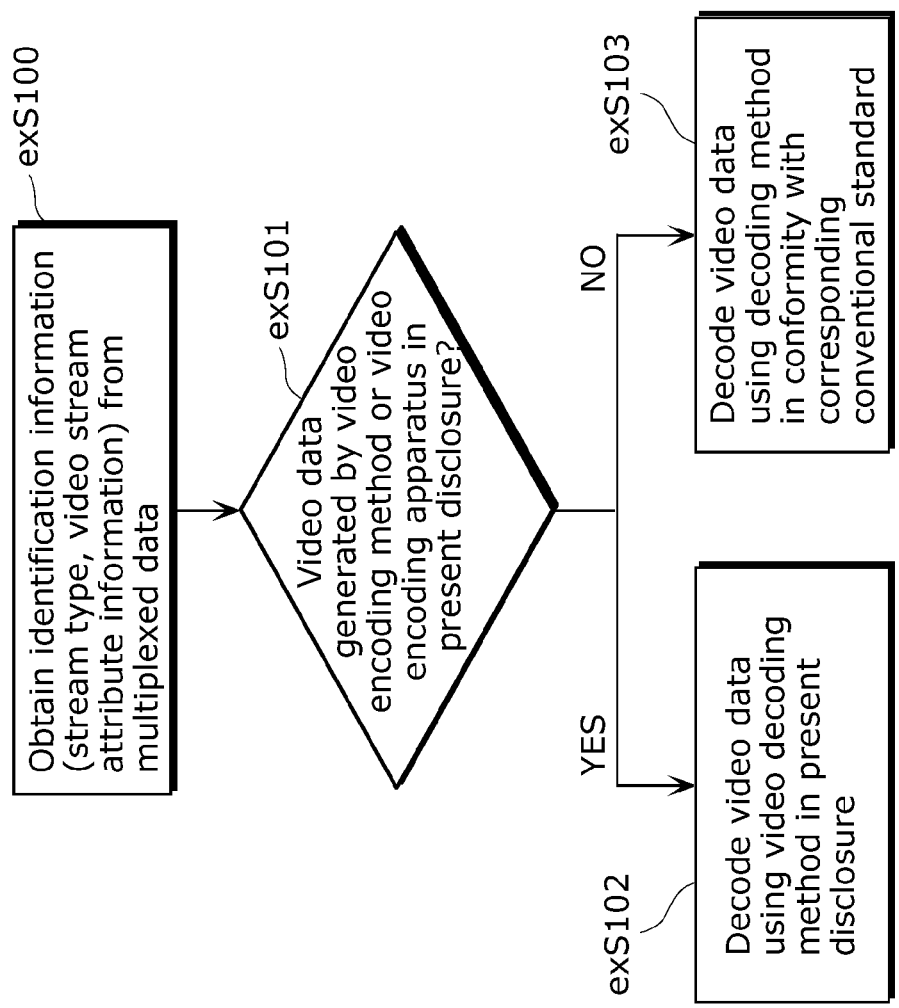
FIG. 41 shows steps for identifying video data.

Furthermore, FIG. 41 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture encoding method or the moving picture encoding apparatus in each of embodiments. When it is determined that the stream type or the video stream attribute information indicates that the multiplexed data is generated by the moving picture encoding method or the moving picture encoding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture encoding method or apparatus, or the moving picture decoding method or apparatus in the present embodiment can be used in the devices and systems described above.

Embodiment 5

Figure 42:
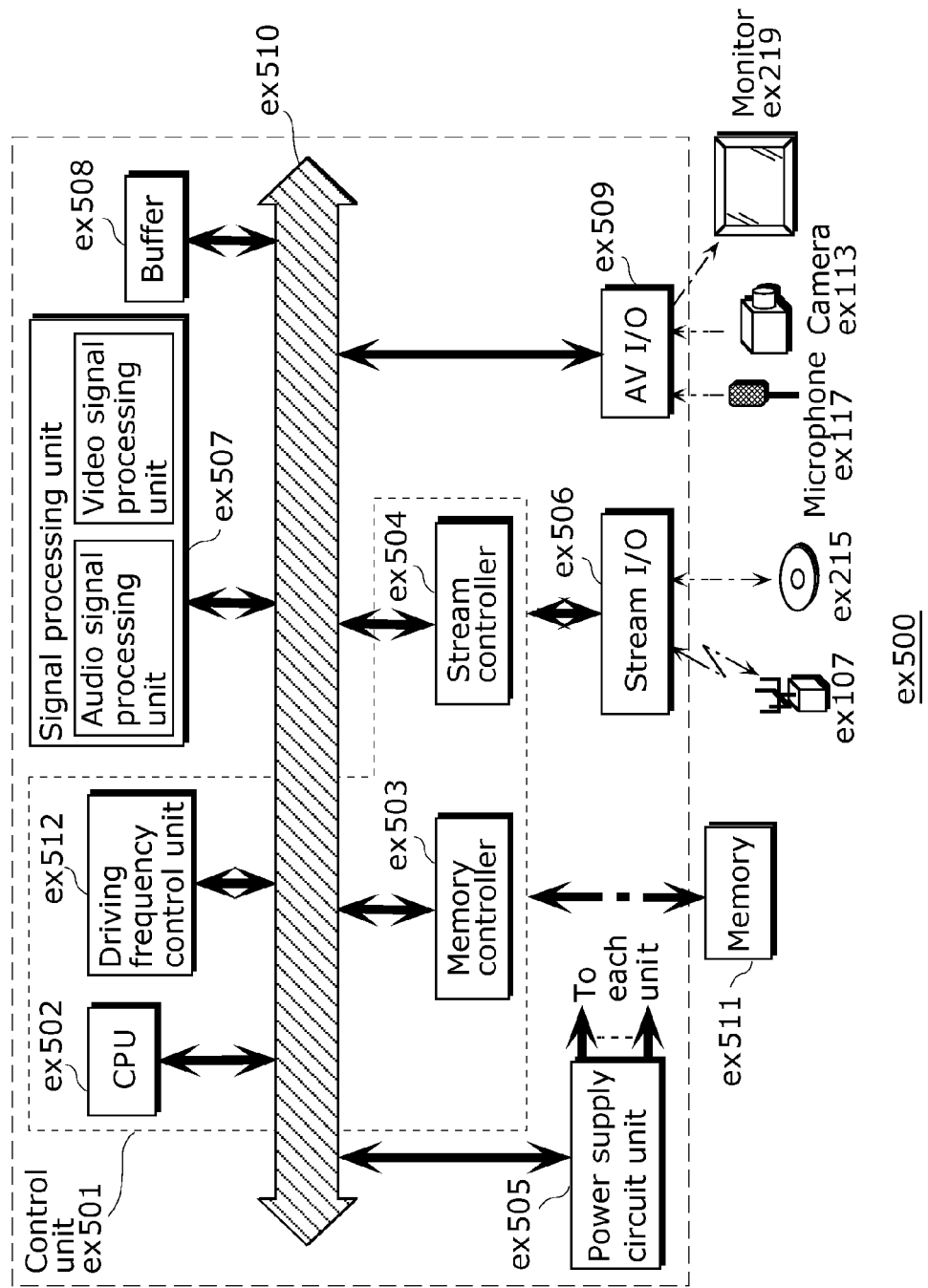
FIG. 42 shows an example of a configuration of an integrated circuit for implementing the moving picture encoding method and the moving picture decoding method according to each of embodiments.

Each of the moving picture coding method and the moving picture coding apparatus in each of embodiments is typically achieved in the form of an integrated circuit or a Large Scale Integrated (LSI) circuit. As an example of the LSI, FIG. 42 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when encoding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 encodes an audio signal and/or a video signal. Here, the encoding of the video signal is the encoding described in each of embodiments. Furthermore, the signal processing unit ex507 sometimes multiplexes the encoded audio data and the encoded video data, and a stream 10 ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present disclosure is applied to biotechnology.

Embodiment 6

When video data generated in the moving picture encoding method or by the moving picture encoding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, the power consumption increases.

Figure 43:
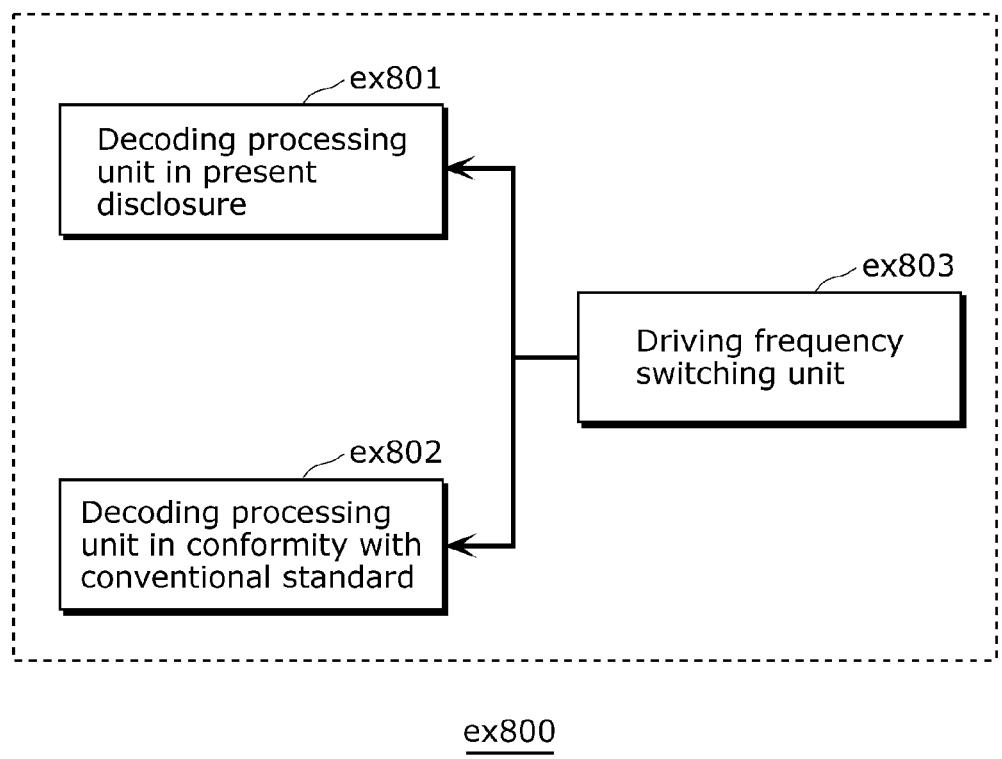
FIG. 43 shows a configuration for switching between driving frequencies.

In view of this, the moving picture decoding apparatus, such as the television ex300 and the LSI ex500 is configured to determine to which standard the video data conforms, and switch between the driving frequencies according to the determined standard. FIG. 43 illustrates a configuration ex800 in the present embodiment. A driving frequency switching unit ex803 sets a driving frequency to a higher driving frequency when video data is generated by the moving picture encoding method or the moving picture encoding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture encoding method or the moving picture encoding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 42. Here, each of the decoding processing unit ex801 that executes the moving picture decoding method described in each of embodiments and the decoding processing unit ex802 that conforms to the conventional standard corresponds to the signal processing unit ex507 in FIG. 42. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 4 is probably used for identifying the video data. The identification information is not limited to the one described in Embodiment 4 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 45. The driving frequency can be selected by storing the look-up table in the buffer ex508 and in an internal memory of an LSI, and with reference to the look-up table by the CPU ex502.

Figure 44:
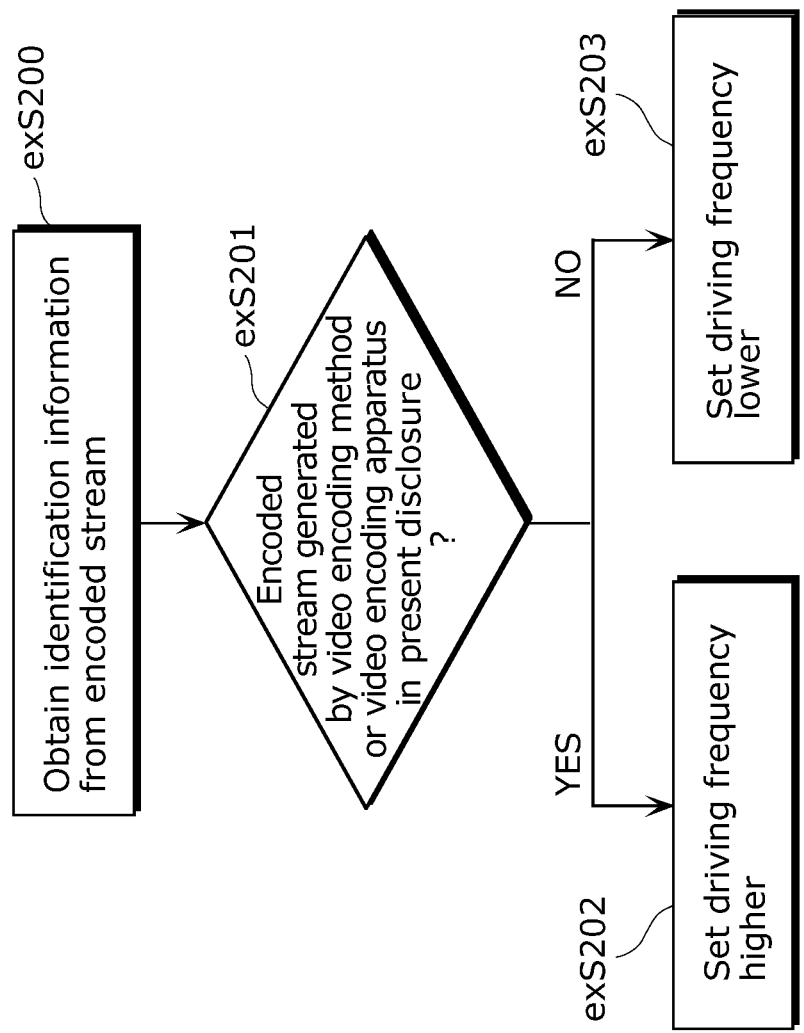
FIG. 44 shows steps for identifying video data and switching between driving frequencies.

FIG. 44 illustrates steps for executing a method in the present embodiment. First, in Step exS200, the signal processing unit ex507 obtains identification information from the multiplexed data. Next, in Step exS201, the CPU ex502 determines whether or not the video data is generated by the encoding method and the encoding apparatus described in each of embodiments, based on the identification information. When the video data is generated by the moving picture encoding method and the moving picture encoding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture encoding method and the moving picture encoding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture encoding method and the moving picture encoding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture encoding method and the moving picture encoding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture encoding method and the moving picture encoding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture encoding method and the moving picture encoding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 7

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, increase in the scale of the circuit of the LSI ex500 and increase in the cost arise with the individual use of the signal processing units ex507 that conform to the respective standards.

Figure 46A:
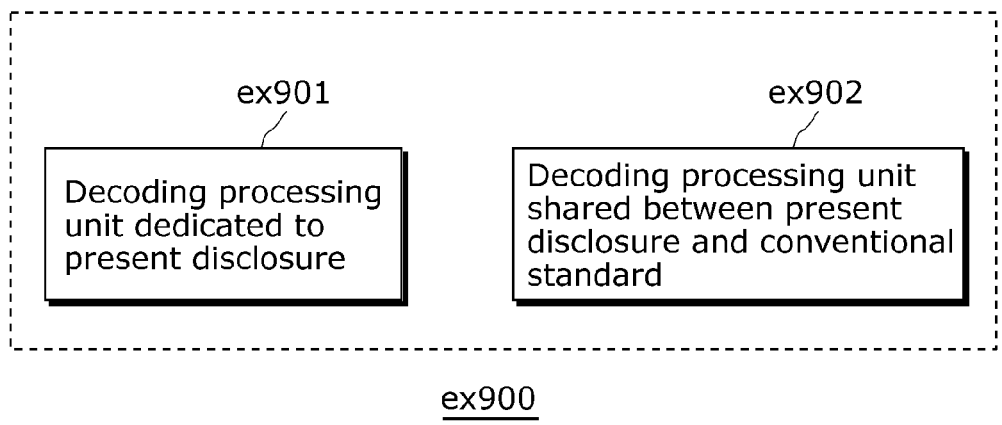
FIG. 46A is a diagram showing an example of a configuration for sharing a module of a signal processing unit.

In view of this, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 46A shows an example of the configuration. For example, the moving picture decoding method described in each of embodiments and the moving picture decoding method that conforms to MPEG-4 AVC have, partly in common, the details of processing, such as entropy encoding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing which is unique to an aspect of the present disclosure and does not conform to MPEG-4 AVC. Since the aspect of the present disclosure is characterized by motion compensation in particular, for example, the dedicated decoding processing unit ex901 is used for motion compensation. Otherwise, the decoding processing unit is probably shared for one of the inverse quantization, entropy decoding, and deblocking filtering, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 46B:
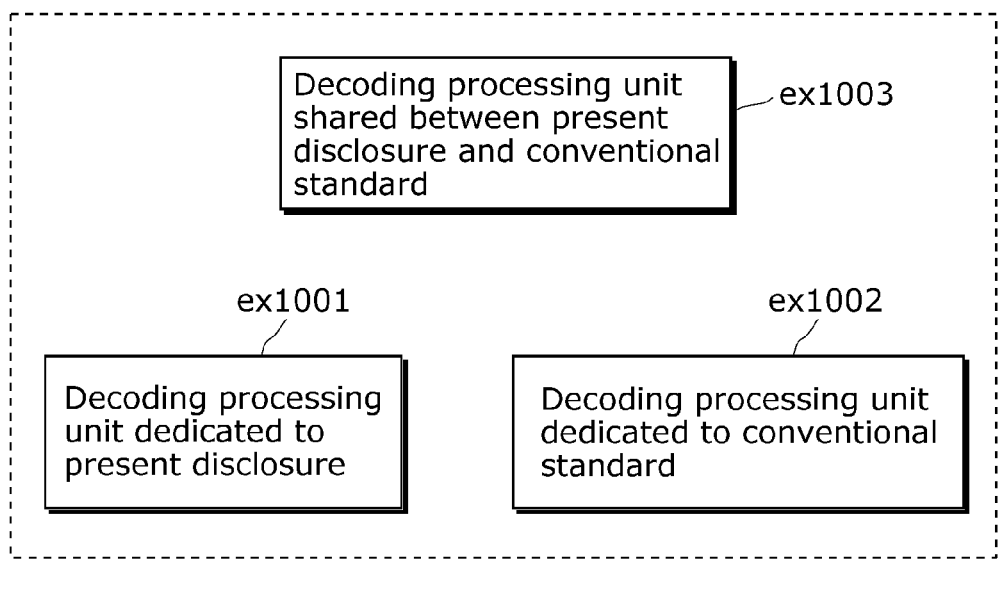
FIG. 46B is a diagram showing another example of a configuration for sharing a module of the signal processing unit.

Furthermore, ex1000 in FIG. 46B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

The herein disclosed subject matter is to be considered descriptive and illustrative only, and the appended Claims are of a scope intended to cover and encompass not only the particular embodiments disclosed, but also equivalent structures, methods, and/or uses.

INDUSTRIAL APPLICABILITY

One or more exemplary embodiments disclosed herein are applicable to applicable to an image encoding method, an image decoding method, an image encoding apparatus, and an image decoding apparatus. Moreover, one or more exemplary embodiments disclosed herein are applicable to an information display device or an imaging device having high resolution such as a television, a digital video recorder, a car navigation system, a mobile phone, a digital camera, and a digital video camera that include an image encoding apparatus.

The invention claimed is:

1. An image encoding method comprising:
generating a first bitstream by encoding an input image, and generating a first decoded image by encoding and decoding the input image; and
generating a second bitstream by encoding the input image using the first decoded image, and generating a second decoded image by encoding and decoding the input image;
wherein the second decoded image has resolution or image quality higher than resolution or image quality of the first decoded image,
the generating of a second bitstream and a second decoded image includes generating a prediction block for a current block by intra prediction,
in the generating of a prediction block, the prediction block is generated using (i) pixels included in the second decoded image as top and left reference pixels for the current block, and (ii) pixels included in the first decoded image as right and bottom reference pixels for the current block,
the intra prediction includes a first mode in which a prediction pixel for a current pixel is generated using reference pixels in an upper direction, a left direction, a lower direction, and a right direction of the current pixel included in the current block, and
in the generating of a prediction block, in the first mode, the prediction pixel is generated using (i) pixels that are in an upper direction and a left direction of the current block and are included in the second decoded image, as reference pixels in an upper direction and a left direction of the current block, and (ii) pixels that are in a right direction and a lower direction of a co-located block of the current pixel and are included in the first decoded image, as reference pixels in a right direction and a lower direction of the current pixel.

2. The image encoding method according to claim 1, wherein the intra prediction includes a DC mode in which prediction pixels for pixels included in the current block are generated using an average of reference pixels adjacent to the current block, and
in the generating of a prediction block, in the DC mode, the prediction pixel is generated using an average of (i) reference pixels that are adjacent to an upper direction and a left direction of the current block and are included in the second decoded image, and (ii) reference pixels that are adjacent to a right direction and a lower direction of a co-located block of the current block and are included in the first decoded image.

3. The image encoding method according to claim 1, wherein the intra prediction includes an Angular mode in which a prediction pixel for a current pixel is generated, using a reference pixel located in a prediction direction of the current pixel included in the current block, and
in the generating of a prediction block, in the Angular mode, the prediction pixel is generated using (i) reference pixels that are in an upper direction, a left direction, a lower left direction, and an upper right direction of the current block and are included in the second decoded image, and (ii) reference pixels that are in a right direction, a lower direction, an upper right direction, and a lower left direction of a co-located block of the current block and are included in the first decoded image.

4. The image encoding method according to claim 1, wherein in the generating of a prediction block:
a plurality of prediction pixels for a plurality of pixels included in the current block are generated; and
prediction pixels at a right end and a lower end in the current block among the prediction pixels are corrected using a co-located pixel of the prediction pixel or a surrounding pixel of the co-located pixel, the collocated pixel and the surrounding pixel being included in the first decoded image.

5. An image decoding method comprising:
generating a first decoded image by decoding a first bitstream; and
generating a second decoded image by decoding a second bitstream using the first decoded image;
wherein the second decoded image has resolution or image quality higher than resolution or image quality of the first decoded image,
the generating of a second decoded image includes generating a prediction block for a current block by intra prediction, in the generating of a prediction block, the prediction block is generated using pixels included in the second decoded image as top and left reference pixels for the current block, and using pixels included in the first decoded image as reference pixels on right and bottom of the current block, the intra prediction includes a first mode in which a prediction pixel for a current pixel is generated using reference pixels in an upper direction, a left direction, a lower direction, and a right direction of the current pixel included in the current block, and in the generating of a prediction block, in the first mode, the prediction pixel is generated using (i) pixels that are in an upper direction and a left direction of the current block and are included in the second decoded image, as reference pixels in an upper direction and a left direction of the current block, and (ii) pixels that are in a right direction and a lower direction of a co-located block of the current pixel and are included in the first decoded image, as reference pixels in a right direction and a lower direction of the current pixel.

6. The image decoding method according to claim 5, wherein the intra prediction includes a DC mode in which prediction pixels for pixels included in the current block are generated using an average of reference pixels adjacent to the current block, and in the generating of a prediction block, in the DC mode, the prediction pixel is generated using an average of (i) reference pixels that are adjacent to an upper direction and a left direction of the current block and are included in the second decoded image, and (ii) reference pixels that are adjacent to a right direction and a lower direction of a block located at a co-located block of the current block and are included in the first decoded image.

7. The image decoding method according to claim 5, wherein the intra prediction includes an Angular mode in which a prediction pixel for a current pixel is generated using a reference pixel located in a prediction direction of the current pixel included in the current block, and in the generating of a prediction block, in the Angular mode, the prediction pixel is generated using (i) reference pixels that are in an upper direction, a left direction, a lower left direction, and an upper right direction of the current block and are included in the second decoded image, and (ii) reference pixels that are in a right direction, a lower direction, an upper right direction, and a lower left direction of a co-located block of the current block and are included in the first decoded image.

8. The image decoding method according to claim 5, wherein in the generating of a prediction block:

a plurality of prediction pixels for a plurality of pixels included in the current block are generated; and prediction pixels at a right end and a lower end in the current block among the prediction pixels are corrected using a co-located pixel of the prediction pixel or a surrounding pixel of the co-located pixel, the co-located pixel and the surrounding pixel being included in the first decoded image.

9. An image encoding apparatus comprising:

a first encoder which generates a first bitstream by encoding an input image, and generates a first decoded image by encoding and decoding the input image; and a second encoder which generates a second bitstream by encoding the input image using the first decoded image, and generates a second decoded image by encoding and decoding the input image;

wherein the second decoded image has resolution or image quality higher than resolution or image quality of the first decoded image, the second encoder includes an intra prediction unit configured to generate a prediction block for a current block by intra prediction, the intra prediction unit is configured to generate the prediction block using (i) pixels included in the second decoded image as top and left reference pixels for the current block, and (ii) pixels included in the first decoded image as right and bottom reference pixels for the current block, the intra prediction includes a first mode in which a prediction pixel for a current pixel is generated using reference pixels in an upper direction, a left direction, a lower direction, and a right direction of the current pixel included in the current block, and the intra prediction unit is configured to, in the first mode, generate the prediction pixel using (i) pixels that are in an upper direction and a left direction of the current block and are included in the second decoded image, as reference pixels in an upper direction and a left direction of the current block, and (ii) pixels that are in a right direction and a lower direction of a co-located block of the current pixel and are included in the first decoded image, as reference pixels in a right direction and a lower direction of the current pixel.

10. An image decoding apparatus comprising:

a first decoder which generates a first decoded image by decoding a first bitstream; and a second decoder which generates a second decoded image by decoding a second bitstream using the first decoded image;

wherein the second decoded image has resolution or image quality higher than the resolution or the image quality of the first decoded image, the second decoder includes an intra prediction unit configured to generate a prediction block for a current block by intra prediction, the intra prediction unit is configured to generate the prediction block using (i) pixels included in the second decoded image as top and left reference pixels for the current block, and (ii) pixels included in the first decoded image as right and bottom reference pixels for the current block, the intra prediction includes a first mode in which a prediction pixel for a current pixel is generated using reference pixels in an upper direction, a left direction, a lower direction, and a right direction of the current pixel included in the current block, and the intra prediction unit is configured to, in the first mode, generate the prediction pixel using (i) pixels that are in an upper direction and a left direction of the current block and are included in the second decoded image, as reference pixels in an upper direction and a left direction of the current block, and (ii) pixels that are in a right direction and a lower direction of a co-located block of the current pixel and are included in the first decoded image, as reference pixels in a right direction and a lower direction of the current pixel.

11. An image coding apparatus comprising:

the image encoding apparatus according to claim 9; and an image decoding apparatus, wherein the image decoding apparatus includes:

a first decoder which generates a first decoded image by decoding a first bitstream; and a second decoder which generates a second decoded image by decoding a second bitstream using the first decoded image;

wherein the second decoded image has resolution or image quality higher than resolution or image quality of the first decoded image, the second decoder includes an intra prediction unit configured to generate a prediction block for a current block by intra prediction, the intra prediction unit is configured to generate the prediction block using (i) pixels included in the second decoded image as top and left reference pixels for current block, and (ii) pixels included in the first decoded image as right and bottom reference pixels for the current block, the intra prediction includes a first mode in which a prediction pixel for a current pixel is generated using reference pixels in an upper direction, a left direction, a lower direction, and a right direction of the current pixel included in the current block, and the intra prediction unit is configured to, in the first mode, generate the prediction pixel using (i) pixels that are in an upper direction and a left direction of the current block and are included in the second decoded image, as reference pixels in an upper direction and a left direction of the current block, and (ii) pixels that are in a right direction and a lower direction of a co-located block of the current pixel and are included in the first decoded image, as reference pixels in a right direction and a lower direction of the current pixel.

* * * * *